US011009362B2

(12) United States Patent
Kitchel

(10) Patent No.: US 11,009,362 B2
(45) Date of Patent: *May 18, 2021

(54) GENERATING TRAIL NETWORK MAPS

(71) Applicant: Strava, Inc., San Francisco, CA (US)

(72) Inventor: Davis Kitchel, Norwich, VT (US)

(73) Assignee: Strava, Inc., San Francisco, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 16/529,657

(22) Filed: Aug. 1, 2019

(65) Prior Publication Data

US 2019/0353488 A1 Nov. 21, 2019

Related U.S. Application Data

(63) Continuation of application No. 15/265,403, filed on Sep. 14, 2016, now Pat. No. 10,429,192.

(60) Provisional application No. 62/219,533, filed on Sep. 16, 2015.

(51) Int. Cl.
| | | |
|---|---|---|
| *G01C 21/34* | (2006.01) | |
| *G06F 16/28* | (2019.01) | |
| *G01C 21/20* | (2006.01) | |
| *G01C 21/32* | (2006.01) | |
| *A63B 24/00* | (2006.01) | |
| *G01S 19/14* | (2010.01) | |
| *G01S 19/19* | (2010.01) | |
| *G01S 19/39* | (2010.01) | |

(52) U.S. Cl.
CPC ......... *G01C 21/3484* (2013.01); *G01C 21/20* (2013.01); *G06F 16/285* (2019.01); *A63B 2024/0025* (2013.01); *A63B 2024/0056* (2013.01); *A63B 2024/0071* (2013.01); *G01C 21/32* (2013.01); *G01S 19/14* (2013.01); *G01S 19/19* (2013.01); *G01S 19/39* (2013.01)

(58) Field of Classification Search
None
See application file for complete search history.

(56) References Cited

U.S. PATENT DOCUMENTS

| | | |
|---|---|---|
| 5,857,066 A | 1/1999 | Wyche |
| 6,148,262 A | 11/2000 | Fry |
| 7,454,002 B1 | 11/2008 | Gardner |
| 7,668,691 B2 | 2/2010 | Counts |
| 8,694,240 B1 | 4/2014 | Lookingbill |
| 8,718,927 B2 | 5/2014 | Kitchel |
| 8,949,022 B1 | 2/2015 | Fahrner |
| 8,996,301 B2 | 3/2015 | Kitchel |
| 9,086,288 B2 | 7/2015 | Raychev |
| 9,532,176 B1 | 12/2016 | Gordon |
| 9,683,858 B2 | 6/2017 | Zheng |
| 9,836,672 B2 | 12/2017 | Eastman |
| 2003/0182052 A1 | 9/2003 | Delorme |

(Continued)

OTHER PUBLICATIONS

Cao et al., From GPS Traces to a Routable Road Map, ACM GIS '09, Nov. 4-6, 2009.

(Continued)

*Primary Examiner* — Gregory C. Issing
(74) *Attorney, Agent, or Firm* — Van Pelt, Yi & James LLP

(57) ABSTRACT

Generating trail network maps, including: receiving a plurality of GPS recorded activities; identifying a subset of the plurality of GPS recorded activities that is associated with a trail network region; and generating a trail network map corresponding to the trail network region based at least in part on the subset of the plurality of GPS recorded activities.

18 Claims, 22 Drawing Sheets

(56) References Cited

U.S. PATENT DOCUMENTS

| | | |
|---|---|---|
| 2007/0009863 A1 | 1/2007 | Hart |
| 2007/0073524 A1 | 3/2007 | Song |
| 2008/0262721 A1 | 10/2008 | Guo |
| 2009/0157566 A1 | 6/2009 | Grush |
| 2010/0088023 A1 | 4/2010 | Werner |
| 2011/0087715 A1 | 4/2011 | Martens |
| 2011/0289031 A1 | 11/2011 | Zheng |
| 2012/0209518 A1 | 8/2012 | Nowak |
| 2012/0253488 A1 | 10/2012 | Shaw |
| 2012/0277993 A1 | 11/2012 | Mund |
| 2013/0345978 A1 | 12/2013 | Lush |
| 2014/0095062 A1 | 4/2014 | Wang |
| 2014/0222340 A1 | 8/2014 | Saverio |
| 2014/0244154 A1 | 8/2014 | Modica |
| 2014/0278055 A1 | 9/2014 | Wang et al. |
| 2014/0372022 A1 | 12/2014 | Witmer |
| 2015/0160027 A1 | 6/2015 | Kitchel |
| 2015/0262397 A1 | 9/2015 | Eastman |
| 2016/0182424 A1 | 6/2016 | Maginnis |

OTHER PUBLICATIONS

Goren-Bar et al., A Method for Constructing 3D Traveling Routes from GPS Navigation Data, ACM Sigspatial IWGS '12 , Nov. 6, 2012.

Morris et al., Digital Trail Libraries, Proceedings of the 2004 Joint ACM/IEEE Conference on Digital Libraries (JCDL 04) , Jun. 7-11, 2004.

Zhao et al., CityDrive: A Map_Generating and Speed-Optimizing Driving System, IEEE INFOCOM 2014—IEEE conference on Computer Communications, Apr. 27, 2014.

| Attribute | Type | Value |
|---|---|---|
| Total_Activities | Integer[] | |
| Geometry | Geometry(Point, 4326) | |
| Point_Bearing | Double precision | |
| Found_Bearing | Double precision | |
| Total_Seconds | Integer[] | |
| Time_Diff | Integer | |
| Total_Activities_Count | Integer | |
| Branch_ID | Integer | |
| Direction | Character Varying | |
| ID | Integer | |
| Common_activities_count | Integer | |
| Common_activities | Integer[] | |

FIG. 10

GENERATING TRAIL NETWORK MAPS

CROSS REFERENCE TO OTHER APPLICATIONS

This application is a continuation of co-pending U.S. patent application Ser. No. 15/265,403, entitled GENERATING TRAIL NETWORK MAPS filed Sep. 14, 2016, which claims priority to U.S. Provisional Patent Application No. 62/219,533, (Attorney Docket No. STRAP010+) entitled GENERATING TRAIL NETWORK MAPS filed Sep. 16, 2015, both of which are incorporated herein by reference for all purposes.

BACKGROUND OF THE INVENTION

A globally comprehensive and accurate map of trail networks does not exist as no mapping organization has a globally comprehensive and accurate routable trail network system. Trails are often on dirt or otherwise unpaved terrain, which also makes the automated mapping (e.g., via car) of trails difficult. What is more, because trails are dirt-based paths, their shapes may change over time (e.g., due to the weather and/or wear), which further complicates the mapping of them.

BRIEF DESCRIPTION OF THE DRAWINGS

Various embodiments of the invention are disclosed in the following detailed description and the accompanying drawings.

FIG. 10 is a diagram that shows a portion of an example network point table.

DETAILED DESCRIPTION

Figure 1:
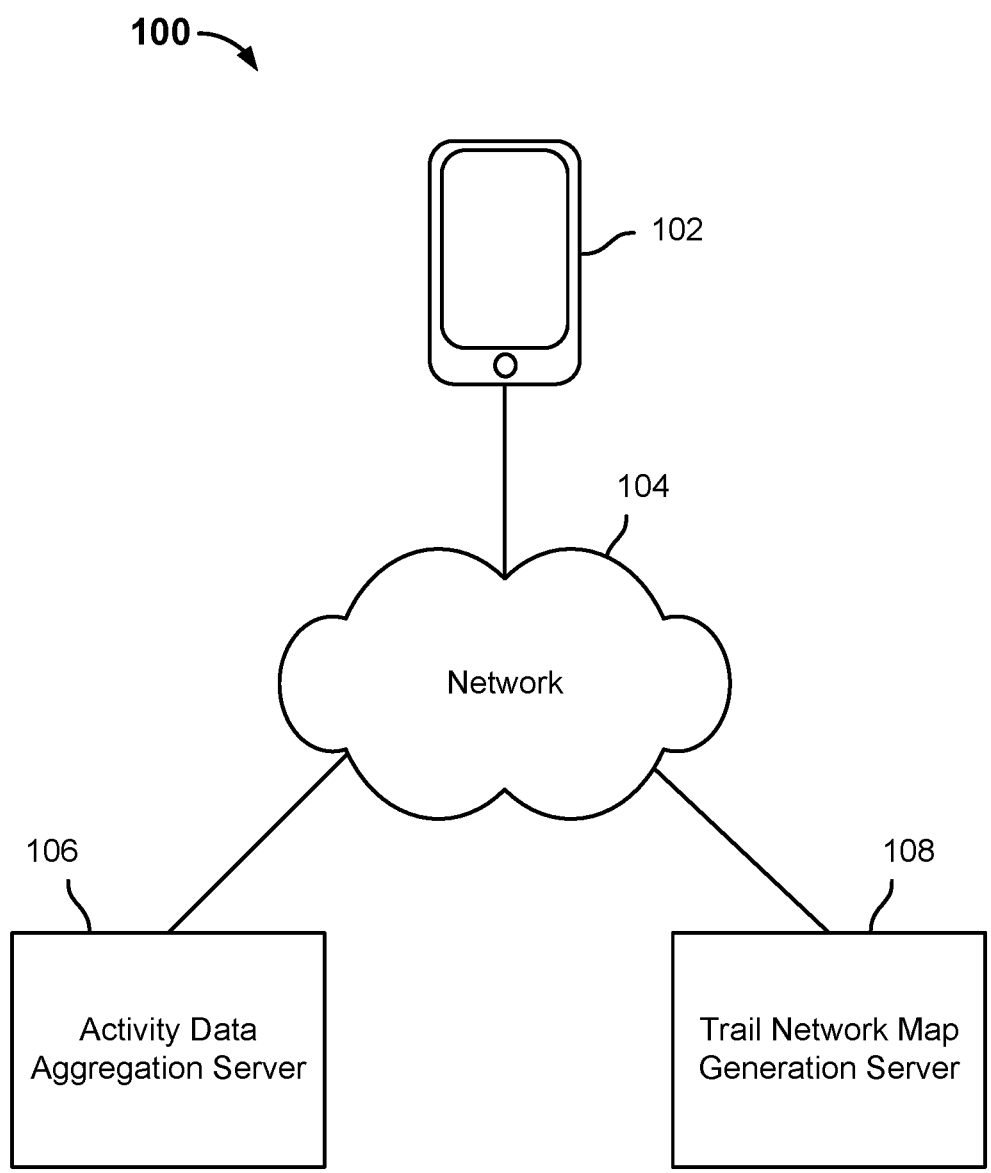
FIG. 1 is a diagram showing an example of a system for generating trail network maps in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Conventionally, the mapping out of trail networks faces several difficulties. For example, recorded global position system (GPS) information may suffer from inaccuracies from imprecise GPS recording devices such that a particular GPS recording and/or a particular GPS recording device may not generate completely reliable shape information associated with a trail network. Furthermore, a particular set of GPS recorded information associated with a trail network may not traverse each branch of the trail network. Furthermore, trails, which may be on unpaved paths, may change over time based on the season, weather, surface conditions, and wear from travelers. Additionally, over time, new branches can be added to and old branches may be removed from a trail network.

Embodiments of generating trail network maps are described herein. To generate trail network maps, a plurality of GPS recorded activities are first received. In various embodiments, a GPS recorded activity comprises a recorded instance of an athletic performance, such as a run or a bike ride, for example. For example, each GPS recorded activity is recorded by a GPS-enabled device with at least GPS data points and timestamps along various points of the GPS recorded activity. Auxiliary data (e.g., speed, heartrate, power) may also be sometimes recorded with each GPS data point of a GPS recorded activity. A subset of the plurality of GPS recorded activities that is associated with a trail network region is identified. In various embodiments, a "trail network region" is a demarcated or bounded area of geography that is determined to include a trail network. In various embodiments, a "trail network" includes one or more trail branches (or sometimes referred to herein as simply "branches"), some of which may intersect with each other. A trail network map is generated corresponding to the trail network region based at least in part on the subset of the plurality of GPS recorded activities. In various embodiments, the portions of the GPS recorded activities that intersect the trail network region may be used to determine the GPS locations (e.g., GPS data points), which are sometimes referred herein as "network points," along one or more branches of the trail network in the trail network region. In some embodiments, adjacent network points inside the trail network are connected to obtain a map of the trail network. In some embodiments, the trail network map may be presented (e.g., at a user interface) and/or used to provide routing information.

Generating trail network maps as described herein leverages portions of aggregated GPS recorded activity data that intersect a region including a trail network to recursively map out locations along each branch of the trail network. In some embodiments, GPS recorded activity data that is more recently recorded may be used to determine the most up-to-date shape of the trail network. Any inaccuracies in GPS information that may arise from a single source/device of recording the shape of a trail network may be avoided or mitigated by using aggregated recorded GPS recorded activity data.

FIG. 1 is a diagram showing an example of a system for generating trail network maps in accordance with some embodiments. In the example, system 100 includes device 102, network 104, activity data aggregation server 106, and trail network generation server 108. Network 104 may include high-speed data networks and/or telecommunication networks.

Device 102 is a device that can record GPS data and/or other data associated with a GPS recorded activity. Device 102 can also be a device to which GPS data and/or other data associated with a physical activity can be uploaded or transferred. Examples of device 102 include, but are not limited to: a GPS device (e.g., Garmin Forerunner® and Edge® devices, including Garmin Forerunner® 110, 205, 301, 305, 310XT, 405, 405CX, and Garmin Edge® 305, 605, 705, 500, 800, 810, and 1000, and newer models as they become available), a mobile device, such as a smart phone (e.g., an Android®-based device or Apple iPhone® device) including a GPS recording application (e.g., MotionX®, Endomondo®, Strava®, and) RunKeeper®, a computer, a tablet device, and/or other general purpose computing devices and/or specialized computing devices, which typically include a general processor, a memory or other storage component(s), a network or input/output (I/O) capability, and possibly integrated GPS functionality or support or an interface for a GPS device or GPS functionality.

In various embodiments, device 102 (or an activity tracking application executing thereon such as, a Strava® app, for example) is configured to record GPS data and auxiliary data associated with each instance of an athlete activity during the activity. For example, auxiliary data associated with a GPS recorded activity may include physiological, environmental, and/or performance data. In some embodiments, device 102 is configured to receive recorded GPS data and auxiliary data associated with a GPS recorded activity subsequent to the completion of the activity (e.g., such information is uploaded to device 102).

In some embodiments, a "GPS recorded activity" refers to an instance of an athletic performance. Example types of a GPS recorded activity include cycling, running, and skiing. In some embodiments, GPS data includes a series of consecutive and discrete GPS data points (e.g., latitude and longitude coordinates sometimes referred to as "Lat-Lng Data") with a timestamp for each GPS data point. In some embodiments, auxiliary data includes, but is not limited to, barometric data (e.g., elevation data), heart rate, power/watts (e.g., energy expended), time, speed (e.g., average and/or maximum speed per segment and/or route, in which average speed, for example, can be derived from time and GPS information), and/or cadence. Auxiliary data can be recorded at various granularities. For example, auxiliary data can correspond to each GPS data point, the entire activity (e.g., the auxiliary data includes averages of the metrics), and/or portions of the activity. As an example, one can use device 102 on a bike ride. At the end of the bike ride, the athlete can review his performance with the recorded GPS data (e.g., through a user interface of device 102) to observe the geographical track that he traversed, how much energy he expended along the ride, how fast he finished it in, average speed, elevation-based metrics, and/or other metrics. In some embodiments, device 102 is configured to store the recorded GPS data and the auxiliary data and/or send the recorded data associated with an athlete activity to activity data aggregation server 106. In some embodiments, device 102 is configured to send the recorded data associated with a GPS recorded activity to activity data aggregation server 106 during the GPS recorded activity (e.g., in real-time) and/or after the GPS recorded activity has been completed. In some embodiments, device 102 is configured to present an interactive user interface (e.g., through an activity tracking application executing at device 102). The user interface may display GPS data and receive selections (e.g., made by a user) with respect to the displays. In some embodiments, device 102 sends the selections that it receives to group activity determination server 108.

In some embodiments, a user interface may be presented at device 102 to solicit user input of various types of metadata associated with an to-be recorded or already recorded activity data. For example, the user may input at the user interface of device 102 the type of running shoes that the user had worn during a running activity. In another example, the user may input at the user interface of device 102 the type of bike (e.g., mountain bike frame, road bike frame, or cross bike frame) that the user had rode during a cycling activity.

Activity data aggregation server 106 is configured to aggregate recorded athlete activity data from devices such as device 102. In some embodiments, the GPS recorded activity data received at activity data aggregation server 106 is received during the GPS recorded activities (e.g., in real-time) and/or subsequent to the completion of the athletic activities. Activity data aggregation server 106 is configured to store information associated with each GPS recorded activity. For example, information associated with each GPS recorded activity includes an identifier associated with the athlete that performed the activity, the activity type associated with the activity, the date and/or period of time during which the activity took place, the device type that was used to record the activity data, and the equipment used by the athlete during the activity. In some embodiments, the information associated with each GPS recorded activity may include attributes associated with the GPS recorded activity that were input by an athlete and/or attributes associated with the GPS recorded activity that were inferred from the recorded data. In some embodiments, the information associated with each activity is stored by activity data aggregation server 106 in an activity table that comprises an SQL database. Activity data aggregation server 106 is configured to store the set of GPS data (e.g., a set of GPS/Lat-Lng data points) and a corresponding auxiliary data (e.g., barometric/elevation data, timestamps, watts, heart rates, power, etc.) associated with (e.g., recorded GPS data point along) each GPS recorded activity. In some embodiments, the set of GPS data and a corresponding set of auxiliary data associated with each GPS recorded activity are stored by activity data aggregation server 106 in a virtual hard drive (e.g., Amazon Simple Storage Service) associated with dynamically expanding storage availability. Activity data aggregation server 106 is configured to process the data received for each GPS recorded activity and perform spatial indexing for each GPS recorded activity based on the set of GPS data associated with the GPS recorded activity. In some embodiments, in performing spatial indexing, the information from the activity table and the GPS and corresponding auxiliary data from the virtual hard drive are put together and recorded for each recorded GPS data point and put into a PostGIS database or other spatially enabled and indexed data structure. Activity data aggregation server 106 is configured to send the aggregated activity data to trail network map generation server 108.

Trail network map generation server 108 is configured to use aggregated activity data obtained by activity data aggregation server to first determine a trail network region in a given geographic area. For example, the given geographic area may be input by a user. In some embodiments, the geographic area is divided into a grid of tiles. For example, a tile can be 10 meters (m) by 10 m or some other customizable dimension. In some embodiments, trail network map generation server 108 is configured to query activity data aggregation server 106 for activity data associated with a predetermined activity type (e.g., cycling) and optionally, that occurred within a specified period of time, that intersect the tiles in the geographic area. In various embodiments, an activity that "intersects" with one or more tiles comprises an activity for which at least a portion of the GPS data points recorded for the activity are located within the one or more tiles. Then, trail network map generation server 108 is configured to count a number of cycling activities that are associated with a predetermined type of metadata (e.g., cycling activities that are were performed with mountain bike frames) that intersect each tile and determine whether that tile is determined to be associated with a trail network in the geographic area based at least in part on the count. Trail network map generation server 108 is configured to identify set of one or more contiguous tiles that is each determined to be associated with the trail network in the geographic area. If trail network map generation server 108 determines that the identified set of contiguous tiles meets a predetermined contiguous tile threshold, then trail network map generation server 108 is configured to generate a trail network region based at least in part on the set of contiguous tiles. In various embodiments, the trail network region defines the approximated area by which the trail network is contained. In some embodiments, the trail network region is sometimes referred to as a "polygon" and is determined as the set of contiguous tiles and optionally, a buffer of a predetermined distance in addition to the area spanned by the set of contiguous tiles.

After having defined a trail network region, in various embodiments, trail network map generation server 108 is configured to query activity data aggregation server 106 for activities (e.g., that were performed within a predetermined period of time) that intersect the trail network region. In some embodiments, whereas only cycling activity data was used to identify trail network regions (e.g., polygons), activity data associated with multiple (e.g., all) activity types (e.g., cycling, running, hiking, walking) that intersect a trail network region may be obtained from activity data aggregation server 106. In various embodiments, trail network map generation server 108 is configured to record a set of attributes associated with each GPS data point that is included in each portion of an activity data (e.g., that was performed within a predetermined period of time) that was determined to intersect the trail network region. In some embodiments, the set of attributes associated with each GPS data point include attributes that are determined/recorded by a device, input by a user, and/or computed using at least GPS information that was recorded for the activity with which the GPS data point is associated.

Trail network map generation server 108 is configured to use the activity data that intersect the trail network region to determine locations or "network points" along one or more branches within the trail network. As will be described in further detail below, trail network map generation server 108 is configured to select a recorded GPS data point of a portion of an activity that has been determined to intersect the trail network region to use as a reference point from which to determine an initial network point (which is sometimes referred to as a "first step") of a branch. Then, trail network map generation server 108 is configured to map other locations along the same branch of the network branch and/or discover a new branch of the trail network using this initial network point as well as the activity data that intersect the trail network region and the recorded attributes of their GPS data points.

While activity data aggregation server 106 and trail network map generation server 108 are shown to be separate servers in the example of FIG. 1, in some embodiments, the two components may be implemented on a single device or server.

As will be described in further detail below, the techniques disclosed herein for generating trail network maps may be applied to generate a global system of trail networks based on GPS data that can be collected from users of an activity/mapping application (e.g., the commercially available Strava® mobile application (app)) or another activity/mapping application that can collect GPS data from mobile devices (e.g., mobile devices that can provide a GPS tracker using embedded GPS receivers, such as smart phones, GPS devices, and/or other mobile devices that support GPS tracking).

Figure 2:
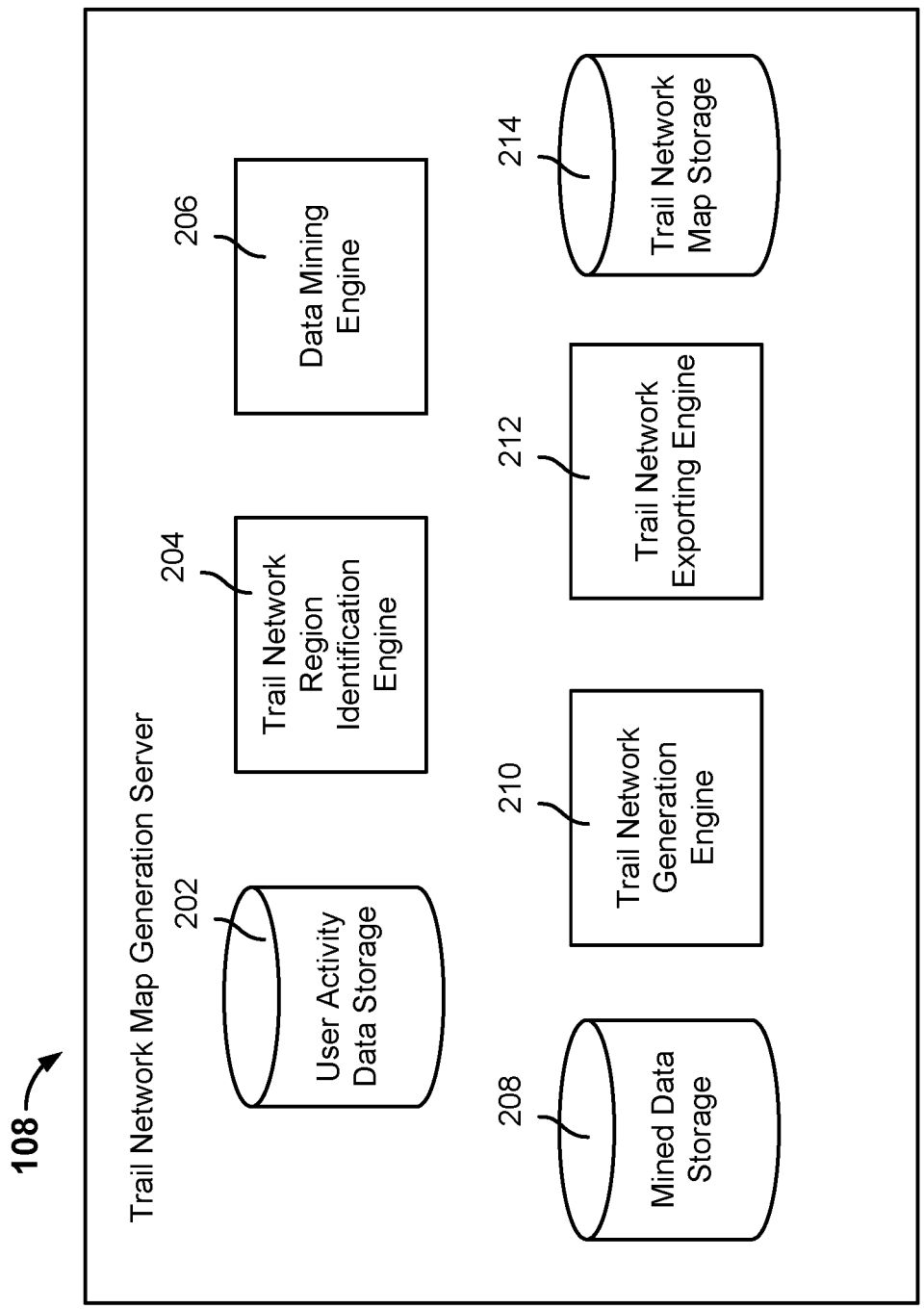
FIG. 2 is a diagram showing an example of a trail network map generation server in accordance with some embodiments.

FIG. 2 is a diagram showing an example of a trail network map generation server in accordance with some embodiments. In some embodiments, trail network map generation server 108 of system 100 of FIG. 1 may be implemented using the example as shown in FIG. 2. In the example, the trail network map generation server 108 includes user activity data storage 202, trail network region identification engine 204, data mining engine 206, mined data storage 208, trail network generation engine 210, trail network exporting engine 212, and trail network map storage 214. Each of trail network region identification engine 204, data mining engine 206, trail network generation engine 210, and trail network exporting engine 212 can be implemented, for example, as distinct or integrated software components, which can include module(s), package(s), and/or other distinct or integrated sub-components to provide an executable computer program that can perform these described functions when executed on a processor, and can be implemented using a programming language such as Go, Java, Python, Objective C, and/or other programming languages. An example hardware computing environment to execute the components of FIG. 2 includes a cloud computing service, such as Amazon's Web Services. Each of user activity data storage 202, mined data storage 208, and trail network map storage 214 may be implemented as one or more databases (e.g., MySQL or Apache Cassandra databases) that may be running Apache Cassandra.

Trail network region identification engine 204 is configured to receive identifying information associated with a geographic area and identify at least one trail network region in the geographic area. For example, the geographic area can be user input and/or selected from one or more known areas (e.g., national parks) from a geographic information source (e.g., the United States Geological Survey (USGS) agency) that are likely to include trail networks. Trail network region identification engine 204 is configured to determine grids of tiles within the geographic area. For example the dimensions of each tile are customizable by a user. In some embodiments, trail network region identification engine 204 is configured to obtain recorded activity data that intersect the tiles of the geographic area that is only associated with cycling from user activity data storage 202 and/or another source. At least some of the cycling activity data that is determined to intersect each tile is stored with user input metadata such as the types of bikes ("bike frames") that were used in the activity. The number of cycling activities that intersect a tile that is associated with mountain bike frames is counted by trail network region identification engine 204. Trail network region identification engine 204 is configured to determine whether a tile in the geographic area is likely to include a portion of trail network based on the count of the number of cycling activities associated with mountain bike frames that have been determined to intersect that tile. Trail network region identification engine 204 is then configured to identify a set of contiguous tiles, each tile being likely to include a portion of the trail network, having reached a predetermined threshold to be associated with a trail network region. In some embodiments, trail network region identification engine 204 is configured to define a trail network region (polygon) as the set of contiguous tiles in addition to an additional buffer that comprises an area that is defined by a predetermined distance away from each side of the set of contiguous tiles to ensure that the entire trail network is contained within the area approximated by the trail network region.

Data mining engine 206 is configured to obtain activity data that intersect a trail network region that was identified by trail network region identification engine 204 from user activity data storage 202 and/or another source. In some embodiments, data mining engine 206 is configured to obtain GPS data points associated with only the portions (e.g., the subset of GPS data points) of activity data that intersect the trail network region and of those activities that were recorded during a predetermined period of time (e.g., the last one year). For example, more recent GPS recorded activity data may be used to ensure that the determined shape of the trail network is the most up-to-date. In some embodiments, whereas trail network region identification engine 204 obtained only cycling data to identify the trail network region, data mining engine 206 is configured to obtain activity data associated with one or more activity types (e.g., hiking, running, cycling, walking). Data mining engine 206 is configured to generate a data structure (e.g., a table) in mined data storage 208 that stores a set of attributes corresponding to each GPS data point that has been determined to intersect the trail network region. In some embodiments, mined data storage 208 comprises a spatially enabled database such as PostGIS or Oracle Spatial or using another open source or commercially available spatially enabled database.

Trail network generation engine 210 is configured to use the GPS data points and the set of attributes corresponding to each GPS data point that is obtained by data mining engine 206 to determine locations (network points) along one or more branches of the trail network within the trail network region. In various embodiments, trail network generation engine 210 is configured to select one recorded GPS data point from an activity data that intersects the trail network region to use to determine an initial network point of an initial branch of the trail network. In various embodiments, trail network generation engine 210 is configured to then recursively compute other network points along the same branch using the initial network point and also discover one or more new branches of the trail network based on the determined network points of a previously determined branch of the trail network, as will be further described below.

Trail network exporting engine 212 is configured to determine a trail network map from the network points along one or more branches of a trail network that were determined by trail network generation engine 210. In some embodiments, trail network exporting engine 212 is configured to determine a continuous line (or is sometimes referred to as a "linestring") through adjacent network points in a branch. In some embodiments, trail network exporting engine 212 is configured to then split linestrings at the intersection of branches and the resulting split linestrings are to be included into a trail network map that describes the location information of branches in the trail network. The trail network map is stored at trail network map storage 214 and may be used to service routing queries associated with the trail network. Splitting of the linestrings at intersections enables each branch to be individually routable.

Figure 3:
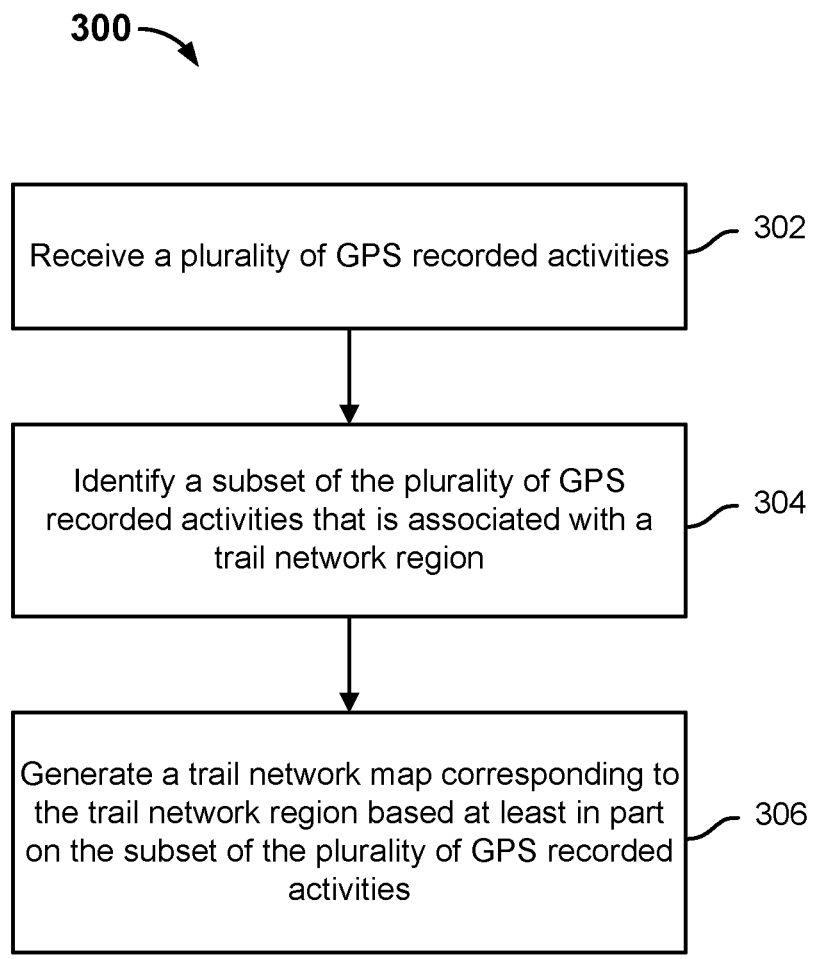
FIG. 3 is a flow diagram showing an example of a process for generating trail network maps in accordance with some embodiments.

FIG. 3 is a flow diagram showing an example of a process for generating trail network maps in accordance with some embodiments. In some embodiments, process 300 is implemented at a system such as system 100 of FIG. 1. Specifically, in some embodiments, process 300 is implemented at trail network map generation server 108 of system 100 of FIG. 1.

At 302, a plurality of GPS recorded activities is received. GPS recorded activities associated with one or more type of activities are obtained from GPS enabled devices that recorded the activities. Examples of activity types include hiking, running, walking, and cycling.

At 304, a subset of the plurality of GPS recorded activities that is associated with a trail network region is identified. A trail network region comprises an approximated area that contains a trail network. In some embodiments, the trail network region comprises a set of contiguous tiles of geographic areas, where each tile is determined to likely include a portion of a trail network based on the portion of at least some of the GPS recorded activities that intersect that tile.

At 306, a trail network map corresponding to the trail network region is generated based at least in part on the subset of the plurality of GPS recorded activities. At least some of the GPS recorded activities that intersect the trail network region are used to determine network points along each branch of the trail network that is included in the trail network region. In some embodiments, adjacent network points along each branch are connected and used to generate a map of the branches of the trail network.

Figure 4:
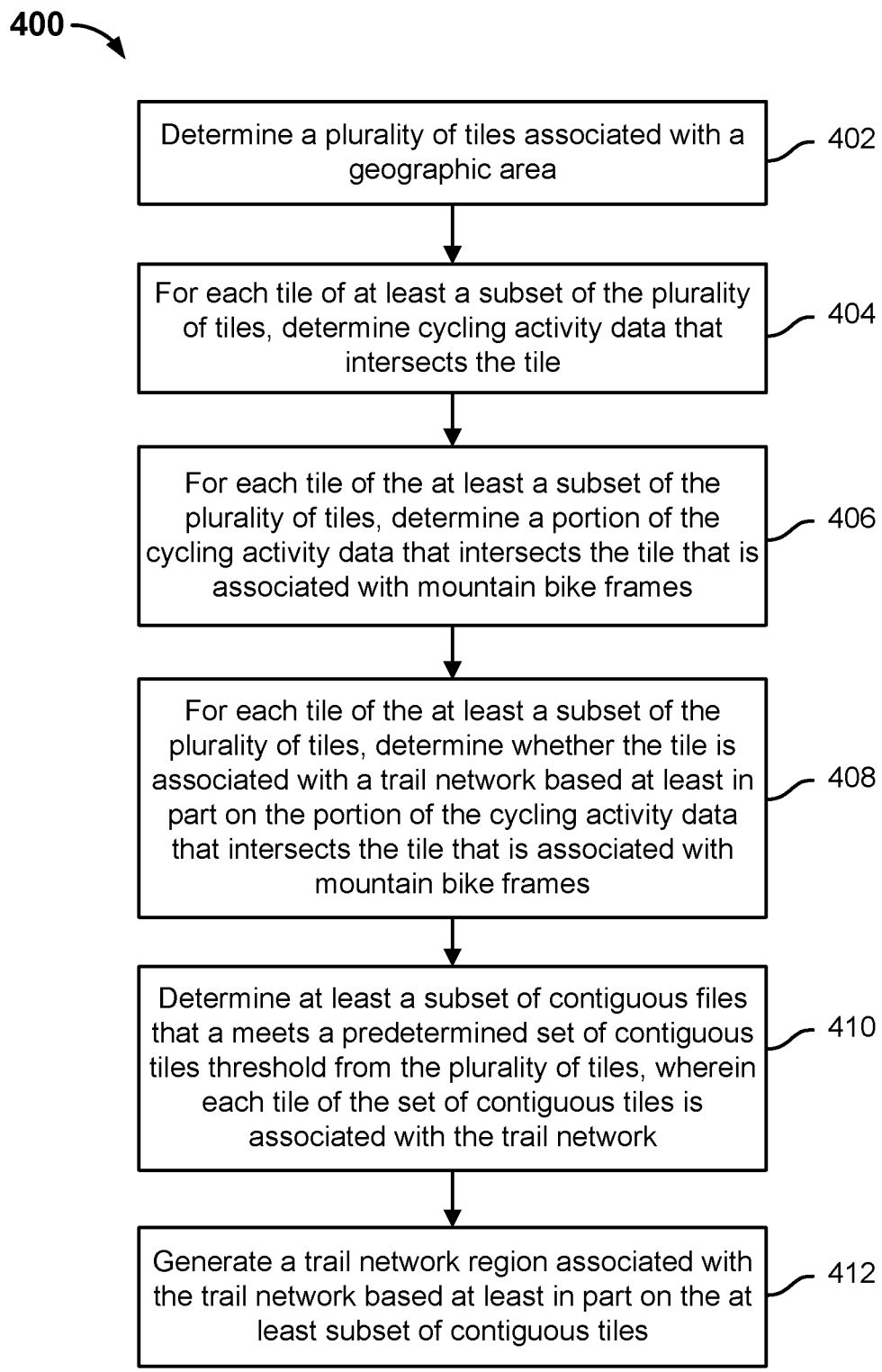
FIG. 4 is a flow diagram showing an example of a process for identifying a trail network region in accordance with some embodiments.

FIG. 4 is a flow diagram showing an example of a process for identifying a trail network region in accordance with some embodiments. In some embodiments, process 400 is implemented at a system such as system 100 of FIG. 1. Specifically, in some embodiments, process 400 is implemented at trail network map generation server 108 of system 100 of FIG. 1.

Process 400 is an example process for identifying a trail network region, which is an approximated area that contains a trail network.

At 402, a plurality of tiles associated with a geographic area is determined. In some embodiments, the geographic area is determined via a user input. In some embodiments, the geographic area is queried from a geographic information source (e.g., USGS) that identifies geographic areas that are likely to be associated with trail networks (e.g., national parks, popular hiking locations). In some embodiments, geographic areas that are known to not be associated with trail networks can also be disqualified from being analyzed by process 400.

In some embodiments, the geographic area is divided into a series of square "tiles." For example, the tiles may be determined using quadtrees. In the quadtree scheme, the size of each tile may be determined based on a zoom level value. Zoom 0 contains the globe as a single tile. Zoom 1 divides the globe into 4 equal tiles. Zoom 2 divides each of the 4 tiles in zoom 2 into 4 tiles, creating 16 tiles. In some embodiments, zoom 16, which divides the globe into more than 4 billion tiles that are roughly 430 meters long and wide, is used in process 400.

At 404, for each tile of at least a subset of the plurality of tiles, cycling activity data that intersects the tile is determined. Cycling activity data (e.g., the GPS data points and other metadata that have been recorded for cycling types of activities) that intersect any tile in the geographic area is identified. Cycling activity data that intersects a tile comprises cycling activities that includes at least some one GPS data point that was recorded within the area spanned by that file.

At 406, for each tile of the at least a subset of the plurality of tiles, a portion of the cycling activity data that intersects the tile that is associated with mountain bike frames is determined. In various embodiments, each activity (e.g., a recorded series of GPS data points) is stored with metadata, such as the type of equipment, if any, that was used by the user during the GPS enabled device recorded the activity. The metadata may be input by the user and/or otherwise determined. The type of bicycle that was used by a user in a recorded activity is referred to as a "bike frames." Examples of bike frames include mountain bike frames (typically used on trails and otherwise dirt-based paths), road bike frames (typically used on paved roads), and cross bike frames (can be used on either trails or paved roads). In some embodiments, the number of cycling activities that intersect each tile and that are performed using mountain bike frames is counted. In some embodiments, the number of cycling activities that intersect each tile and that are performed using road bike frames is counted. In some embodiments, the number of cycling activities that intersect each tile and that are performed using cross bike frames is counted.

At 408, for each tile of the at least a subset of the plurality of tiles, whether the tile is associated with a trail network is determined based at least in part on the portion of the cycling activity data that intersects the file that is associated with mountain bike frames. In some embodiments, the ratio of the number of cycling activities that intersect each tile and that are performed using mountain bike frames relative to the number of all cycling activities (e.g., the sum of the number of cycling activities across all bike frames, including at least mountain bike frames, cross bike frames, and road bike frames) that intersect the tile, regardless of associated with bike frame is determined. In some embodiments, the ratio of the sum of the number of cycling activities that intersect each tile and that are performed using either mountain bike frames or cross bike frames relative to the number of all cycling activities (e.g., the sum of the number of cycling activities across all bike frames, including at least mountain bike frames, cross bike frames, and road bike frames) that intersect the tile, regardless of associated with bike frame is determined. In various embodiments, the computed ratio for a tile is compared against a predetermined threshold ratio to determine whether the tile is likely associated with (e.g., likely include a portion of) a trail network in the geographic area. For example, the predetermined threshold ratio is configured to be 80%.

At 410, at least a subset of contiguous files that a meets a predetermined set of contiguous tiles threshold from the plurality of tiles is determined, wherein each tile of the set of contiguous tiles is associated with the trail network. Then, contiguous tiles that are each determined to likely be associated with the trail network are determined. The determined set of contiguous tiles is compared to predetermined set of contiguous tiles threshold to determine whether the set of contiguous tiles are likely to include the trail network. In some embodiments, the predetermined set of contiguous tiles threshold comprises an area covered by the set of contiguous tiles. In some embodiments, the predetermined set of contiguous tiles threshold is determined based at least in part on the selected size of each tile.

At 412, a trail network region associated with the trail network is generated based at least in part on the at least a subset of contiguous tiles. The trail network region, an approximated area that is determined to contain the trail network is generated using at least the set of contiguous tiles. In some embodiments, in addition to the area covered by set of contiguous tiles, an additional area that is determined by a predetermined distance extending from the area covered by set of contiguous tiles is also included in the trail network area. Because the shape of the trail network region is determined as a set of contiguous tiles and optionally, an additional buffer, resembles a polygon, the trail network region is sometimes referred to as a "polygon."

Figure 5:
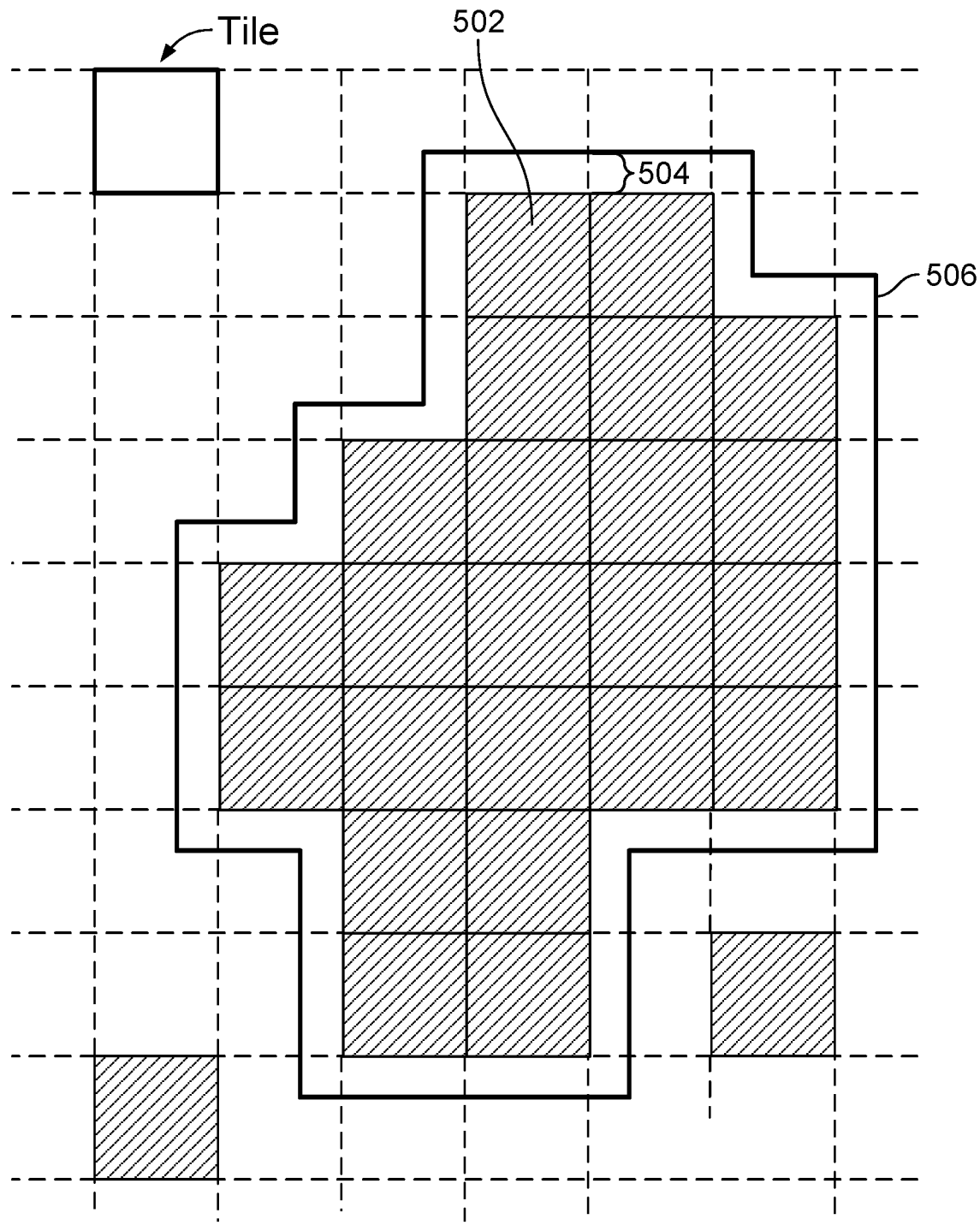
FIG. 5 is an example of an identified trail network region in accordance with some embodiments.

FIG. 5 is an example of an identified trail network region in accordance with some embodiments. FIG. 5 shows a grid of square tiles that has been determined for a geographic area. Applying a process such as process 400 of FIG. 4 to the tiles, each tile that is determined to be likely associated with (e.g., likely include a portion of) a trail network in the geographic area is shown as shaded. Then, set of contiguous tiles 502, where each tile is each determined to be likely associated with the trail network, which meets a predetermined set of contiguous tiles threshold is determined. In the example of FIG. 5, trail network region 506 (a polygon) is determined by adding a buffer that comprises the area covered by extending the boundary of set of contiguous tiles 502 by predetermined distance 504. As such, trail network region 506 is an area that is approximated to enclose a trail network and is bounded by boundary 506.

Figure 6:
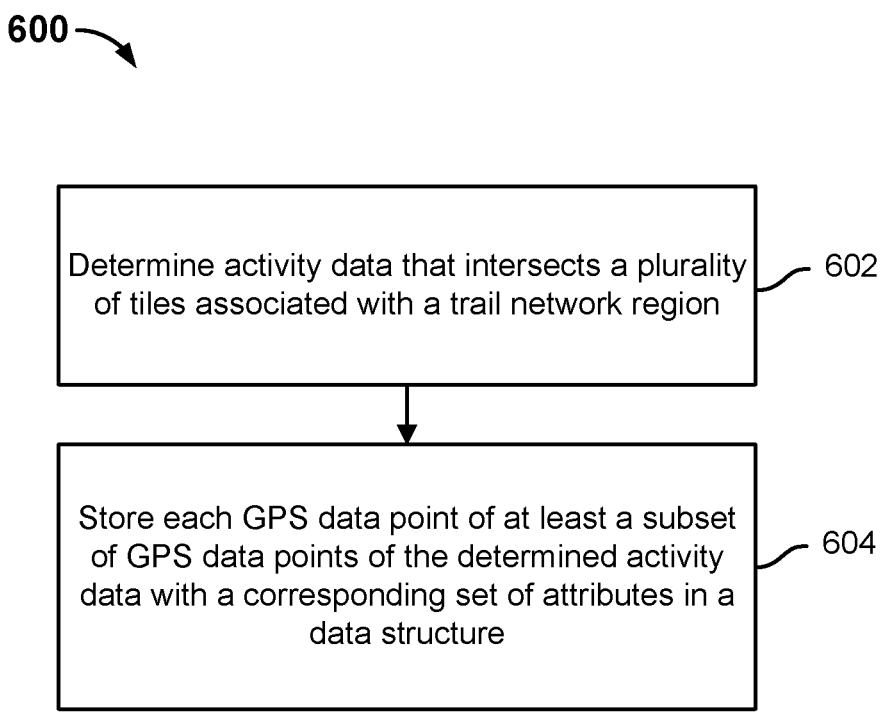
FIG. 6 is a flow diagram showing an example of identifying GPS recorded activities that are associated with a trail network region in accordance with some embodiments.

FIG. 6 is a flow diagram showing an example of identifying GPS recorded activities that are associated with a trail network region in accordance with some embodiments. In some embodiments, process 600 is implemented at a system such as system 100 of FIG. 1. Specifically, in some embodiments, process 600 is implemented at trail network map generation server 108 of system 100 of FIG. 1. In some embodiments, step 304 of process 300 of FIG. 3 is implemented at least in part using process 600.

Process 600 is an example process for mining activity data that is relevant to an identified trail network region. The mined activity data may then be used by another process of determining the locations along branches of the trail network that is within the trail network region, as will be described in a process such process 700 of FIG. 7, below.

At 602, activity data that intersects a plurality of tiles associated with a trail network region is determined. In various embodiments, at least portions of activity data associated with multiple activity types (e.g., hiking, running, walking, and cycling) that intersect an identified trail network region are obtained. For example, the trail network region is identified using a process such as process 400 of FIG. 4. In some embodiments, the activity data associated with multiple activity types that intersect the identified trail network are activities that have been recorded during a predetermined (e.g., user configured) period of time. For example, the predetermined period of time may be the most recent six months because trail networks often change through wear and weather patterns. A portion of a recorded activity that intersects the trail network region includes one or more GPS data points of the activity that are located within the boundaries of the trail network region.

At 604, a set of attributes corresponding to each GPS data point of at least a subset of GPS data points of the determined activity data is stored in a data structure. In various embodiments, each GPS data point of the determined activity data that intersects/is located within the trail network region is stored with a corresponding set of attributes in a data structure (e.g., data table) (e.g., in a spatially enabled database). In some embodiments, the attributes in a set that is stored with each GPS data point include attributes that are recorded by a GPS enabled device that also recorded the activity, computed at least in part on the recorded GPS data points of the activity, and/or user input.

The following are some example attributes that can be stored with each GPS data point:

"Type: character varying": describes the type of activity.

"Athlete_id: integer": describes the identifier of the user that performed the activity.

"Activity_id: integer": describes the identifier of the activity.

"Device_type: integer": describes the type of GPS enabled device that was used to record the activity.

"Start_date_local: timestamp (without time zone)": describes the start time of recording the activity with which the GPS data point is associated.

"Seconds: integer": describes the number of seconds into the activity at which the GPS data point was recorded.

"Elevation: double precision": describes the elevation at which the GPS data point was recorded.

"Created_at: timestamp (without time zone)": describes the date and time that the activity was uploaded to an activity data aggregation server.

"Updated_at: timestamp (without time zone)": describes the date and time that the data stored on the activity data aggregation server was last updated.

"Frame_type: integer": describes the type of bike that was used in the activity.

"Latlng: geometry (Point,4326)": describes the latitude-longitude of the GPS data point.

"Bearing: double precision": describes the bearing (e.g., direction) of the GPS data point.

"Hr: double precision": describes the heart rate at the time the GPS data point was recorded (when available).

"Watts: double precision": describes the units of power generated by the user at the GPS data point.

"Moving: integer": describes the whether the person recording was moving or stationary.

Figure 7:
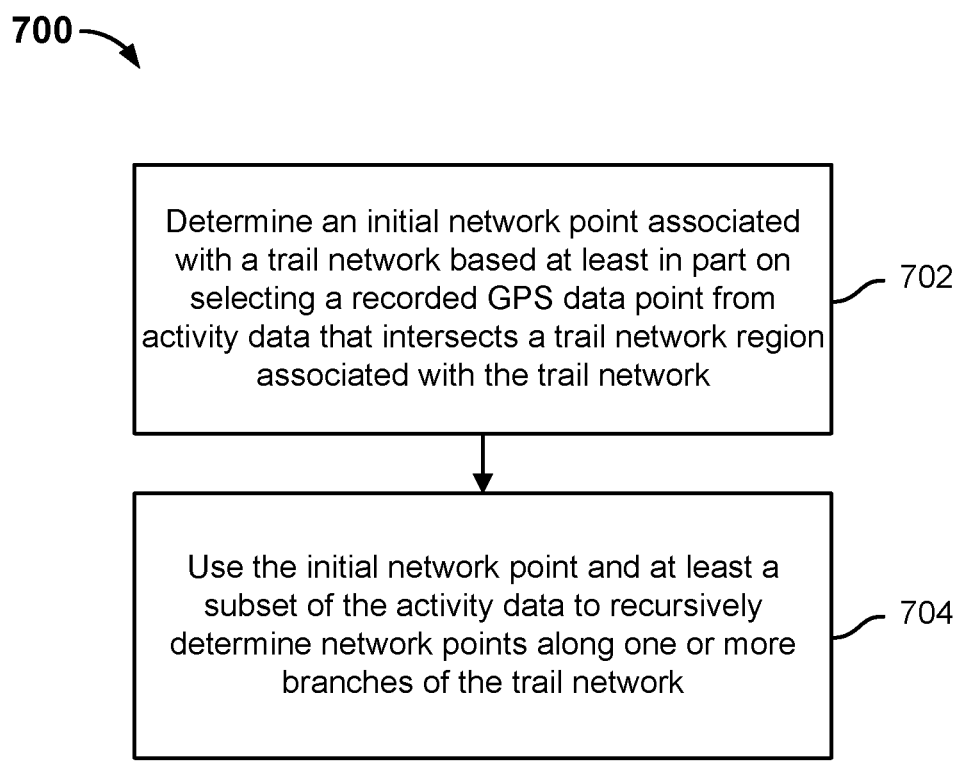
FIG. 7 is a flow diagram showing an example of determining locations of branches of a trail network in accordance with some embodiments.

FIG. 7 is a flow diagram showing an example of determining locations of branches of a trail network in accordance with some embodiments. In some embodiments, process 700 is implemented at a system such as system 100 of FIG. 1. Specifically, in some embodiments, process 700 is implemented at trail network map generation server 108 of system 100 of FIG. 1. In some embodiments, step 306 of process 300 of FIG. 3 is implemented at least in part using process 700.

Process 700 is an example process for generating a trail network based on the obtained activity data that intersects the trail network region that includes the trail network.

At 702, an initial location associated with a trail network is based at least in part on selecting a recorded GPS data point from activity data that intersects a trail network region associated with the trail network. In various embodiments, activity data that intersects a trail network region associated with the trail network has already been determined using a process such as process 600 of FIG. 6. In some embodiments, a particular recorded GPS data point that is located within the trail network region and is associated with an activity that has been determined to intersect the trail network region is selected to use as a reference point to use to determine the initial network point of an initial branch of the trail network.

The recorded GPS data point to use as a reference point to use to determine the initial network point of an initial branch of the trail may be selected using various techniques. In a first example, the recorded GPS data point is arbitrarily selected from various recorded activity GPS data points that are located within the trail network region of the activities that intersect the trail network region. In a second example, the recorded GPS data point is arbitrarily selected from various recorded activity GPS data points that are located within the trail network region of the activities that intersect the trail network region and where such activities are recorded by a selected type of GPS enabled device (e.g., a device that is known to have high accuracy in recording GPS information). In a third example, a recorded GPS data point may be selected to use as a reference point to use to determine the initial network point if it is determined that the recorded GPS data has a predetermined number (e.g., a predetermined percentage of total number of distinct activities that have been determined to intersect the trail network region, e.g., 5%) of distinct activities within a predetermined area around it (e.g., within 10 m of that GPS data point). In a fourth example, the trail network region is divided into grids and a grid that has at least a threshold number of distinct activities within a predetermined area (e.g., 5 m or 10 m) is found. Then, an activity that intersects that grid is selected and the earliest recorded GPS data point of the selected activity that is determined to intersect/be located within the trail network region is selected to use as a reference point to use to determine the initial network point.

Figure 8:
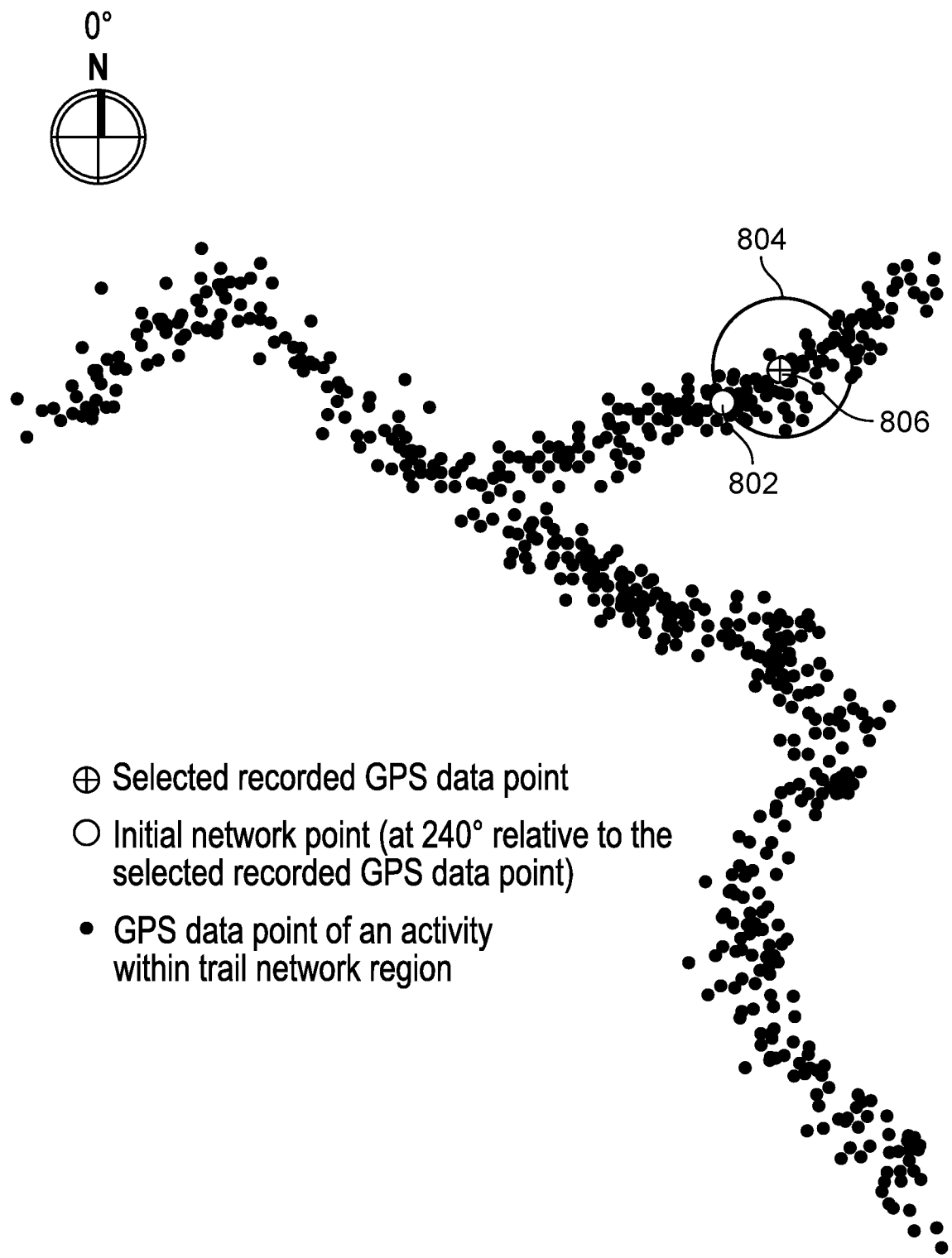
FIG. 8 is a diagram showing an example selected recorded GPS data point and the initial network point that is determined based on the selected recorded GPS data point.

In various embodiments, the number of distinct activities that are a predetermined distance (e.g., 10 m) along the direction of each of 360 degrees relative to the selected recorded GPS data point is determined to select a degree (e.g., a direction relative to the selected recorded GPS data point) that is associated with the most number of distinct activities (which indicates that this direction is likely along the path of a branch of the trail network). For example, at a location 10 m away the selected recorded GPS data point along each degree of 360 degrees relative to the selected GPS data point, a circle of radius 5 m (or any other predetermined radius) is swept out from that location (e.g., there will be 360 such circles, one circle for each degree). Then, the number of distinct activities for which at least one GPS data point thereof is enclosed in each of the circle is determined for that circle. The degree associated with the circle that encloses the most number of distinct activities may be considered the direction relative to the selected recorded GPS data point in which the initial network point is located and the center of this circle may be considered the location of the initial network point. FIG. 8 is a diagram showing an example selected recorded GPS data point and the initial network point that is determined based on the selected recorded GPS data point. In the example, selected recorded GPS data point 806 is shown with GPS data points of activities that have been determined to intersect the trail network region. Circle 804 shows the area that is determined by sweeping a predetermined distance (e.g., 10 m) out from selected recorded GPS data point 806. While not shown in FIG. 8, a circle of a 5 m radius is swept out around each point on circle 804 corresponding to each degree relative to selected recorded GPS data point 806, where cardinal direction north is associated with degree 0 in the example. The number of distinct activities that intersect each circle of the 360 circles is counted and the circle whose center, location 802, is 10 m away and at the $240^{th}$ degree relative to the selected recorded GPS data point 806 is determined to include the most number of distinct activities. As such, location 802 is selected at the initial network point of the initial branch of the trail network.

In some embodiments, the initial network point and information regarding the initial network point's neighborhood of GPS data points associated with activities that intersect the trail network region are recorded in a data structure (e.g., a data table) associated with network points of the trail network. In some embodiments, identifying information of the initial branch of which the initial network point is a part is also included in the network point data structure. Examples of information that is stored with each network point will be described in further detail below.

Returning to 704, the initial network point and at least a subset of the activity data are used to recursively determine network points along one or more branches of the trail network. The recursive process of finding network points along each branch of the trail network uses the initial network point of the initial branch as the first current network point in the trail network. The initial (first current) network point's neighborhood of GPS data points associated with activities that intersect the trail network region are used to determine a next, new current network point (e.g., a new GPS data point that is set as the new current network point) along the same branch of the trail network. Furthermore, the information regarding the new current network point's neighborhood of GPS data points associated with activities that intersect the trail network region are recorded in the network point data structure (e.g., a data table) along with identifying information associated with the branch. Then, the new current network point's neighborhood of GPS data points associated with activities that intersect the trail network region are used to determine a next new current network point along the same branch of the trail network, and so forth. In various embodiments, the current network point's neighborhood of GPS data points associated with activities that intersect the trail network region reveal a new current network point in a new branch in the trail network in addition to a next new current network point along the same branch of the trail network. A similar recursive process of generating each next new current network points is performed in each new branch of the trail network. The recursive process for generating network points in each branch of the trail network branch is performed until a stop condition is found. For example, the stop condition is that a new current network point is within a predetermined distance of a previously generated network point. Or in another example, the stop condition is that a new current network point comprises a GPS data point that is outside of the boundaries of the trail network region.

In various embodiments, while the initial network point of the trail network is determined relative to a selected recorded GPS data point of an activity recorded by a GPS enabled device that intersects the trail network region, each subsequently determined network point may be a GPS data point that is determined relative to the GPS data point of a previously generated network point. As such, generally, a generated network point may not necessarily coincide with a GPS data point that is actually recorded by a GPS enabled device for a recorded activity.

Figure 9:
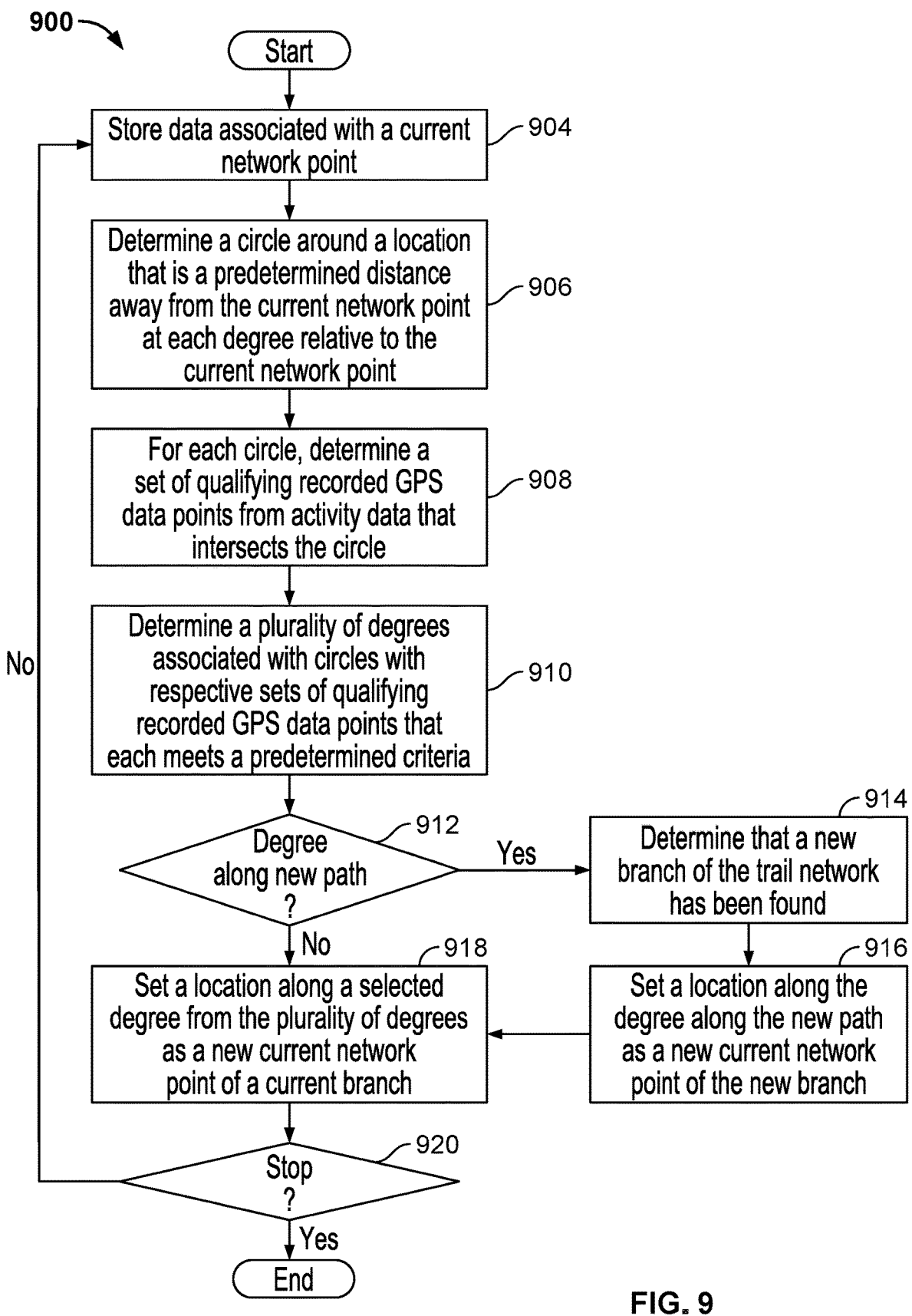
FIG. 9 is a flow diagram showing an example of determining locations of branches of a trail network in accordance with some embodiments.

FIG. 9 is a flow diagram showing an example of determining locations of branches of a trail network in accordance with some embodiments. In some embodiments, process 900 is implemented at a system such as system 100 of FIG. 1. Specifically, in some embodiments, process 900 is implemented at trail network map generation server 108 of system 100 of FIG. 1. In some embodiments, step 306 of process 300 of FIG. 3 is implemented at least in part using process 900.

Process 900 is an example process that describes the recursive process of generating network points in branches of a trail network based on the obtained activity data that intersects the trail network region that includes the trail network.

At 904, data associated with a current network point is stored.

If the current network point is the initial network point for the entire trail network, then the initial network point was determined relative to a selected recorded GPS data point from an activity that was determined to intersect the trail network region. The initial network point can be selected based on a technique such as one of those described with step 702 of process 700 of FIG. 7.

If the current network point is not the initial network point for the trail network, then the current network point was determined by a previous iteration of process 900 relative to the immediately previous current network point.

Data associated with the current network point is stored in a network point table. In some embodiments, data associated with the current network point that is stored in the network point table includes the attributes associated with the current network point and/or the set of GPS data points that is within a neighborhood from the current network point and/or information stored for the immediately previous network point, if one exists. In some embodiments, data associated with the current network point that is stored in the network point table includes the identifying information associated with the branch to which the current network point belongs. FIG. 10 is a diagram that shows a portion of an example network point table. In the example of FIG. 10, the left column of the table includes attributes to be stored for each new current network point, the center column of the table includes the type of the value corresponding to the same row, and the right column of the table includes the corresponding values of a new current network point, which are to be determined. The values of the attributes of the table may be determined from the current network point itself and/or from the set of GPS data points that is within a neighborhood from the current network point and/or information stored for the immediately previous network point, if one exists. The example attributes of the example network point table include:

"Total_activities": an array of total (e.g., distinct) activities found within a predetermined distance (e.g., 5 m) of the network point being considered (the current network point). Note that the network point being considered is located at a predetermined distance (e.g., 10 m) along of a selected degree of the 360 degrees relative to the immediately previous network point (e.g., along the same branch) (or the selected recorded GPS data point if the network point being considered is the initial network point). For example, the network point being considered is located at 10 m along the $270^{th}$ degree relative to the immediately previous network point, so the "Total_activities" value for the current network point includes the identifiers of all the distinct activities that are found within a predetermined distance (e.g., 5 m) around the network point being considered.

"Geometry": the location (e.g., lat-lng coordinate or other the GPS information) of the network point being considered.

"Point_bearing": the degree bearing of the network point being considered is from the immediately previous network point.

"Found_bearing": the "found_bearing" value is determined by first finding the subset of activities whose direction is within a buffer (e.g., of 20 degrees) of the degree the network point being considered is relative to the immediately previous network point (the average direction of travel of the found GPS data points of the activities that is within a buffer (e.g., 20 degrees) of the degree (e.g., the value of the "point_bearing" attribute) relative to the immediately previous network point (or the selected recorded GPS data point if the network point being considered is the initial network point) along which the network point being considered is located. Then, the average direction of travel of the determined subset of activities is stored as the "found_bearing" value. For example, if the network point being considered is located at the $270^{th}$ degree relative to the immediately previous network point, then the subset of activities whose directions are within the 20 degree buffer range (250 to 290 degrees) are identified and the average direction of those activities are stored as the "found_bearing" value for the network point being considered.

"Total_seconds": an array of integers that aligns with the integer array of the "Total_activities" attribute. The "total_seconds" attribute comprises an array of integers, where each integer corresponds to the timestamp recorded for the earliest recorded GPS data point (e.g., within the predetermined radius of 5 m from the network point being considered) corresponding to a corresponding activity in the "total_activities" attribute for the network point being considered.

"Time_diff": the "time_diff" value is determined by first identifying the subset of activities whose direction is within a buffer (e.g., of 20 degrees) of the degree (e.g., the value of the "point_bearing" attribute) the network point being considered is relative to the immediately previous network point. Then, for each activity of the subset, find the difference the activity's "total_seconds" value that is stored for the network point being considered and the activity's "total_seconds" value that is stored for the immediately previous network point. The average of these differences is stored as the value of "time_diff" for the network point being considered.

"Total_activities_count": a count of the distinct activities found within a predetermined distance (e.g., 5 m) of the network point being considered (e.g., the count of the number of integers in the "total_activities" array)

"Branch_ID": includes the identifier of the branch to which the network point being considered belongs.

"Direction": indicates whether the network point being considered is going forwards (in the same direction of travel as the activities found (e.g., in the "total_activities" field) or reverse. This is determined by the "time_diff" field.

"ID": indicates the identifier of the network point being considered.

"Common_activities_count": the number of activities that are in common between the "total_activities" attribute that is stored for the network point being considered and the "total_activities" attribute that is stored for the immediately previous network point.

"Common_activity": an array including the activity identifiers that are in common between the "total_activities" attribute that is stored for the network point being considered and the "total_activities" attribute that is stored for the immediately previous network point.

Figure 11:
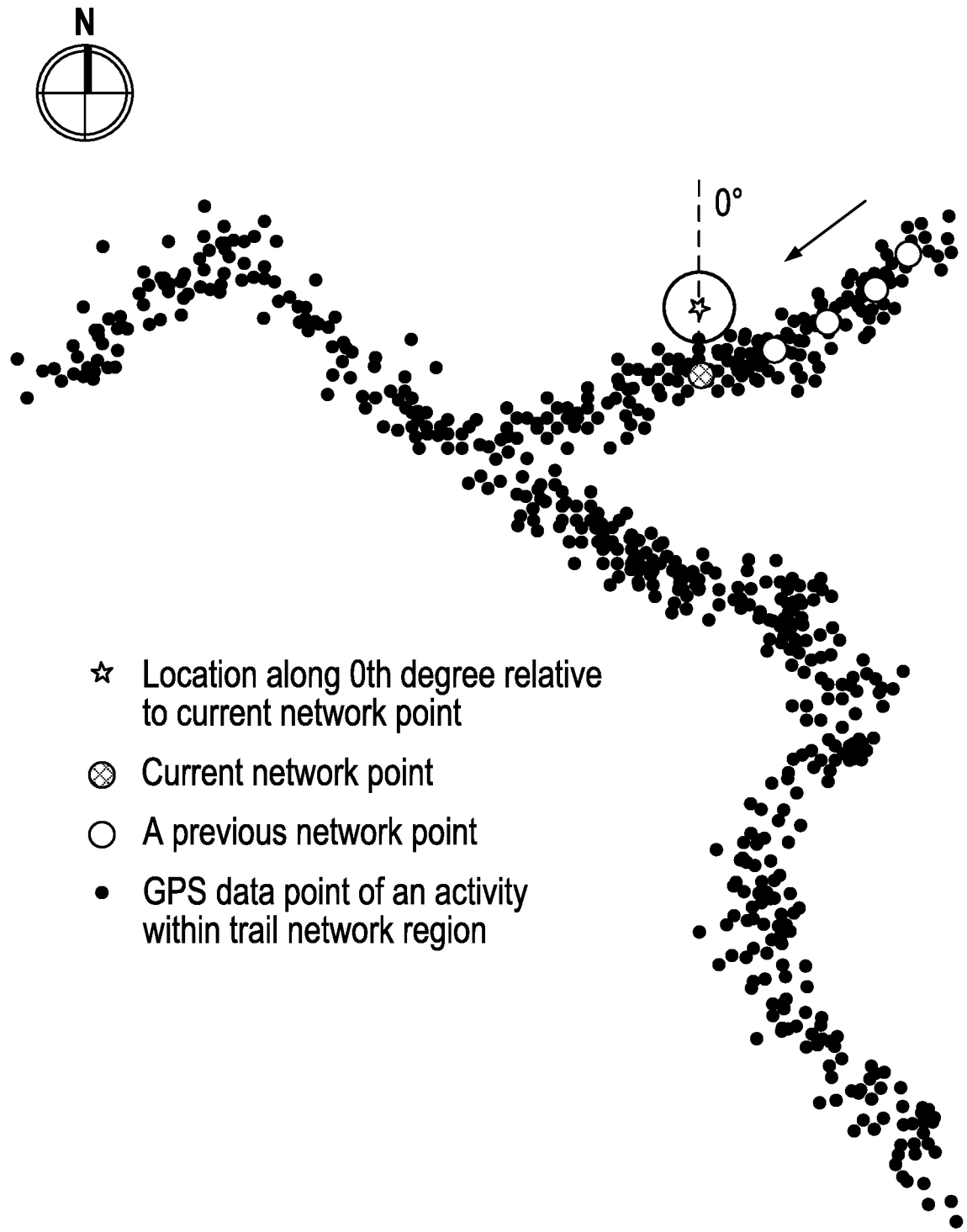
FIG. 11 is a diagram showing a circle that is drawn around a first location that is a predetermined distance away from a current network point.
Figure 12:
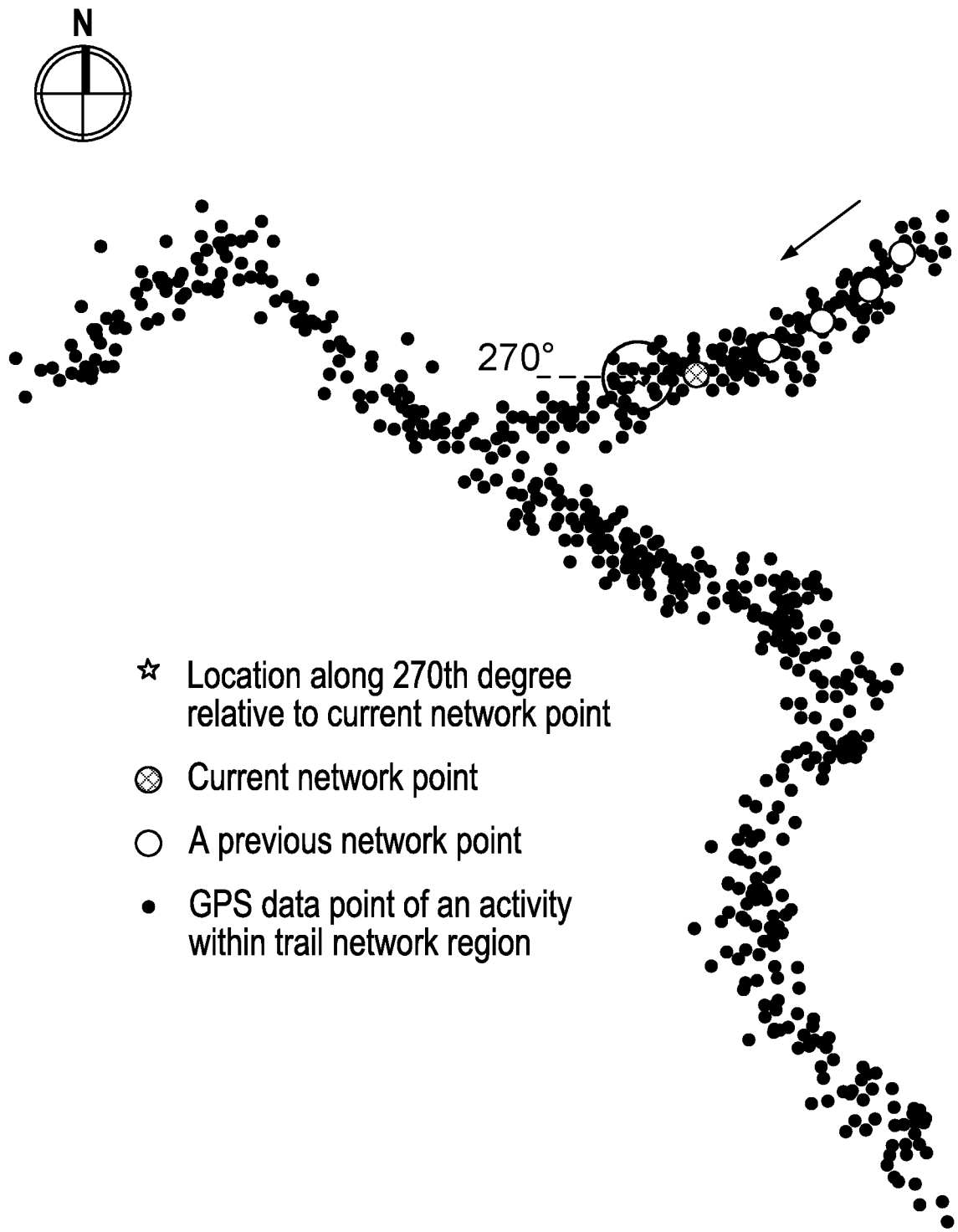
FIG. 12 is a diagram showing a circle that is drawn around a second location that is a predetermined distance away from a current network point.

Returning to FIG. 9, at 906, a circle is determined around a location that is a predetermined distance away from the current network point at each degree relative to the current network point. For each degree of 360 degrees relative to the current network point, a circle of a predetermined radius is drawn around a location that is a predetermined distance away from the current network point. For example, step 906 may be performed by creating 360 instances of a 10 m in diameter circle centered at 10 m away from the current network point, at each of the 360 degrees relative to the current network point. The circle drawn at a location along each degree encloses a set of GPS data points of activities that have been determined to intersect the trail network area. FIG. 11 is a diagram showing a circle that is drawn around a first location that is a predetermined distance away from a current network point. In the example of FIG. 11, a circle that is drawn around a location that is 10 m away from the current network point along the $0^{th}$ degree relative to the current network point is shown. In the example of FIG. 11, the $0^{th}$ degree relative to the current network point is determined as the direction of cardinal direction north. FIG. 12 is a diagram showing a circle that is drawn around a second location that is a predetermined distance away from a current network point. In the example of FIG. 12, a circle that is drawn around a location that is 10 m away from the current network point along the $270^{th}$ degree relative to the current network point is shown. In the example of FIG. 12, the $270^{th}$ degree relative to the current network point is determined as the direction of cardinal direction west.

Returning to FIG. 9, at 908, a set of qualifying recorded GPS data points from activity data that intersect the circle is determined for each circle. For each circle of the 360 circles that is associated with a corresponding degree relative to the current network point, the recorded GPS data points that are enclosed within the circle are analyzed for a set of qualifying recorded GPS data points. A qualifying recorded GPS data point comprises a GPS data point that meets one or more criteria. In some embodiments, a qualifying recorded GPS data point comprises a recorded GPS data point that satisfies the following example criteria:

1) Has an activity identifier (e.g., an activity ID) common to one stored in the "total_activities" attribute (in the network point table) for the immediately previous recorded network point in the current network branch.

2) Has a bearing (e.g., direction of travel) within a given threshold of the degree of the circle being tested. For example, a threshold of 75 degrees, where the degree of the circle is in the center of the 75 degrees, can be applied.

3) Is within a threshold of recording time (e.g., within one minute in recording time) from the previous recorded GPS data point for the same activity (e.g., to ensure that the recorded GPS data points are contiguous).

The number of qualifying recorded GPS data points that is within each circle at each degree relative to the current network point is determined.

At 910, a plurality of degrees associated with circles with respective sets of qualifying recorded GPS data points that each meets a predetermined criterion is determined.

Figure 13:
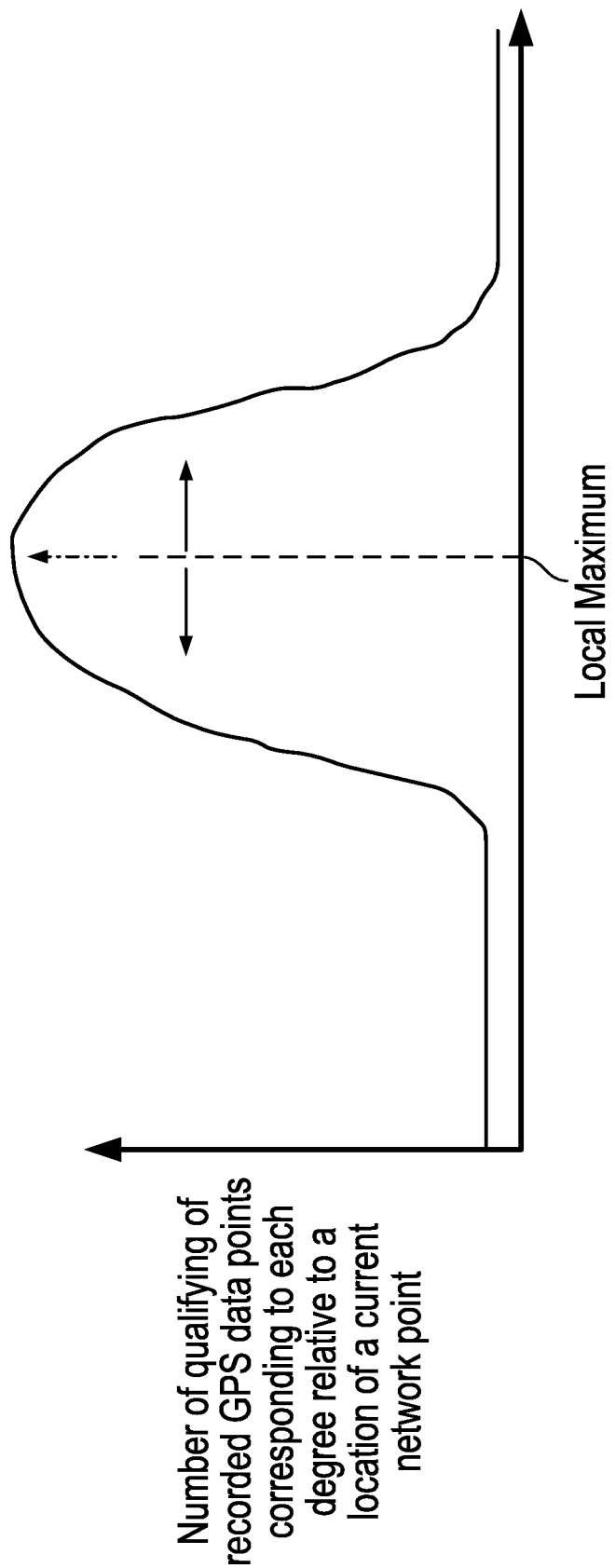
FIG. 13 is a diagram that shows an example spike in the in the number of qualifying recorded GPS data points that is within the circle corresponding to a degree.

In some embodiments, the predetermined criterion is a spike in the number of qualifying recorded GPS data points that is within the circle corresponding to a degree. For example, a histogram of the number of qualifying recorded GPS data points that is within the circle corresponding to each degree may be generated and those degrees with spikes are identified as meeting the predetermined criterion. The presence of a spike at a certain degree indicates that the degree is likely a direction relative current network point along which the current branch (or a new branch) extends. FIG. 13 is a diagram that shows an example spike in the in the number of qualifying recorded GPS data points that is within the circle corresponding to a degree. As shown in the example and in various embodiments, the degree that is associated with a spike is associated with the local maximum of number of qualifying recorded GPS data points relative to the number of qualifying recorded GPS data points associated with neighboring degrees.

Returning to FIG. 9, at 912, it is determined whether a degree from the plurality of degrees is along a new path. In the event that a degree is along a new path, control is transferred to 914. Otherwise, if none of the plurality of degrees is along a new path, control is transferred to 918.

Figure 14:
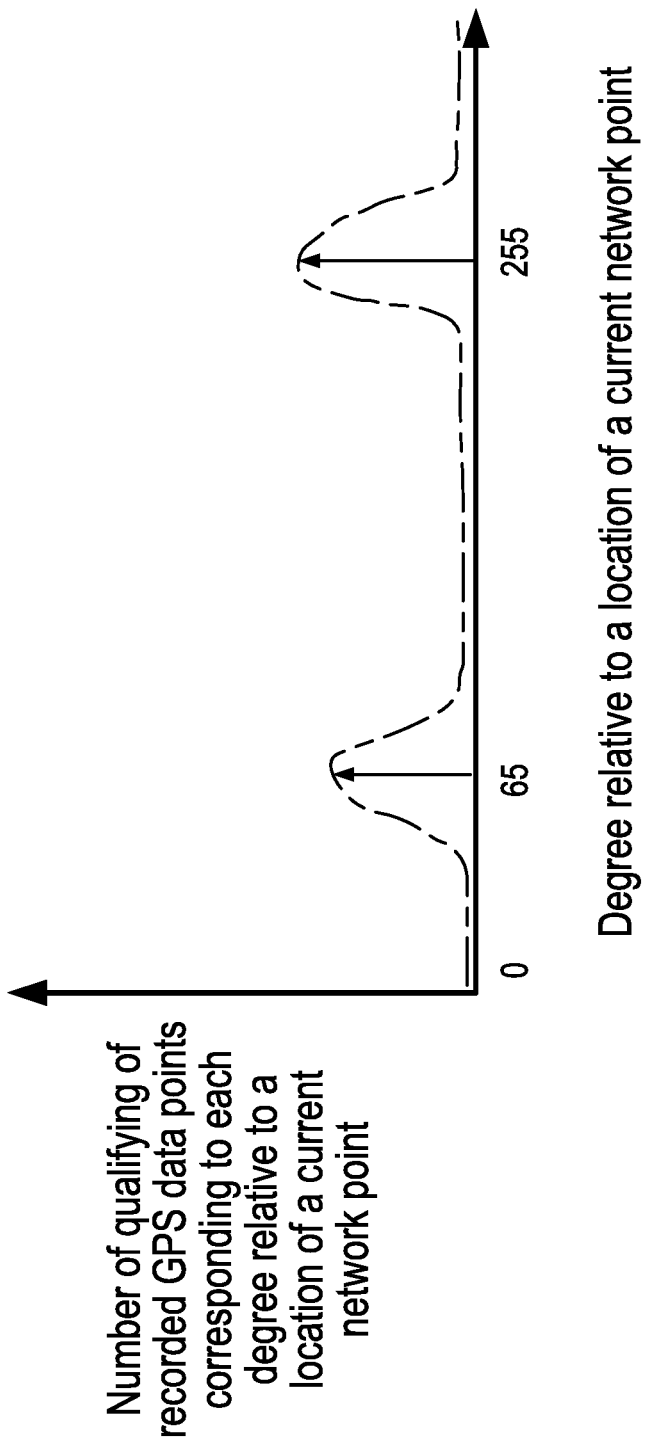
FIG. 14 is a diagram that shows an example of two spikes at two respective degrees relative to a current network point.
Figure 15:
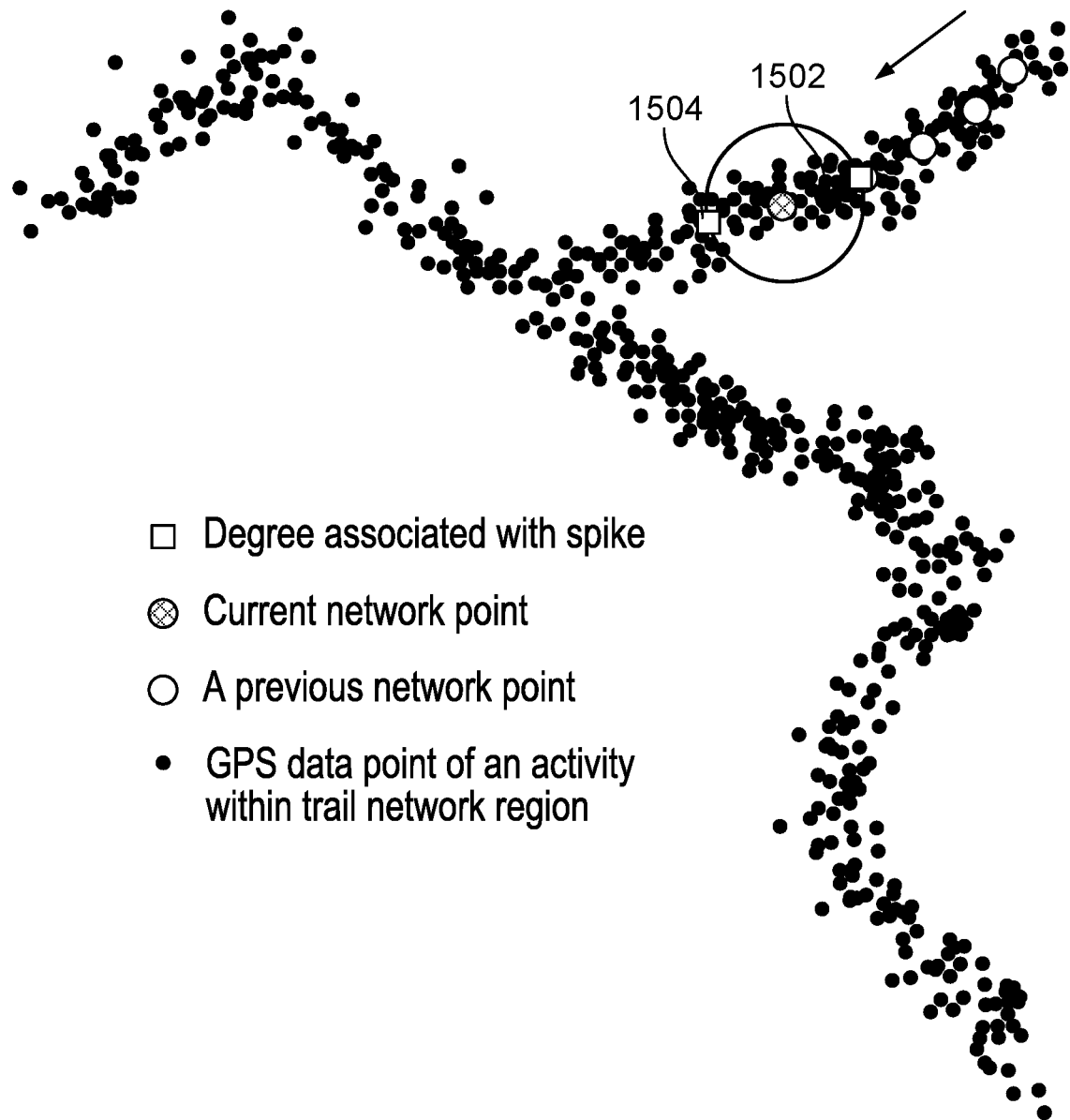
FIG. 15 is a diagram that shows an example that indicates the two locations associated with the two degrees for which spikes have been determined.

For example, on a typical trail, there will be two spikes points found. The two spikes are associated with one degree/direction in front and one degree/direction behind the current network point along the same branch. FIG. 14 is a diagram that shows an example of two spikes at two respective degrees relative to a current network point. In the example of FIG. 14, the two spikes are located specifically at the $65^{th}$ degree and $255^{th}$ degree relative to a current network point. FIG. 15 is a diagram that shows an example that indicates the two locations associated with the two degrees for which spikes have been determined. In the example, locations 1504 and 1502 are locations that are each a predetermined distance (e.g., 10 m) away from the current network point associated with degrees for which spikes have been identified. Location 1502 may be disqualified as a next/new current network point of the current branch because its GPS coordinates are too close (e.g., within a predetermined distance from) to the immediately previous network point in the current branch, the GPS data points within the circle corresponding to location 1502 are mostly from activities going in the opposite direction of the direction of the current branch, and/or if GPS data points from the same activity are found within the circle, they are likely from a return trip back at some point later in which case the recorded time will be greater than, for example, a one minute threshold. Therefore, the GPS data point associated with the other remaining location, location 1504 will be assumed to be along the direction of the current branch and set as the next/new current network point of the current branch.

In the special case in which the current network step is the initial network point of the current branch (i.e., there is no immediately previous network point of the current branch), then the degree associated with the greatest number of distinct activities is selected as the next, new current network point of the current branch for the execution of process 900 and another instance of process 900 can be executed (e.g., asynchronously to other instances of executing process 900) to generate network points starting from a new current network point in the other degree.

Returning to FIG. 9, at 914, it is determined that a new branch of the trail network has been found.

Figure 16:
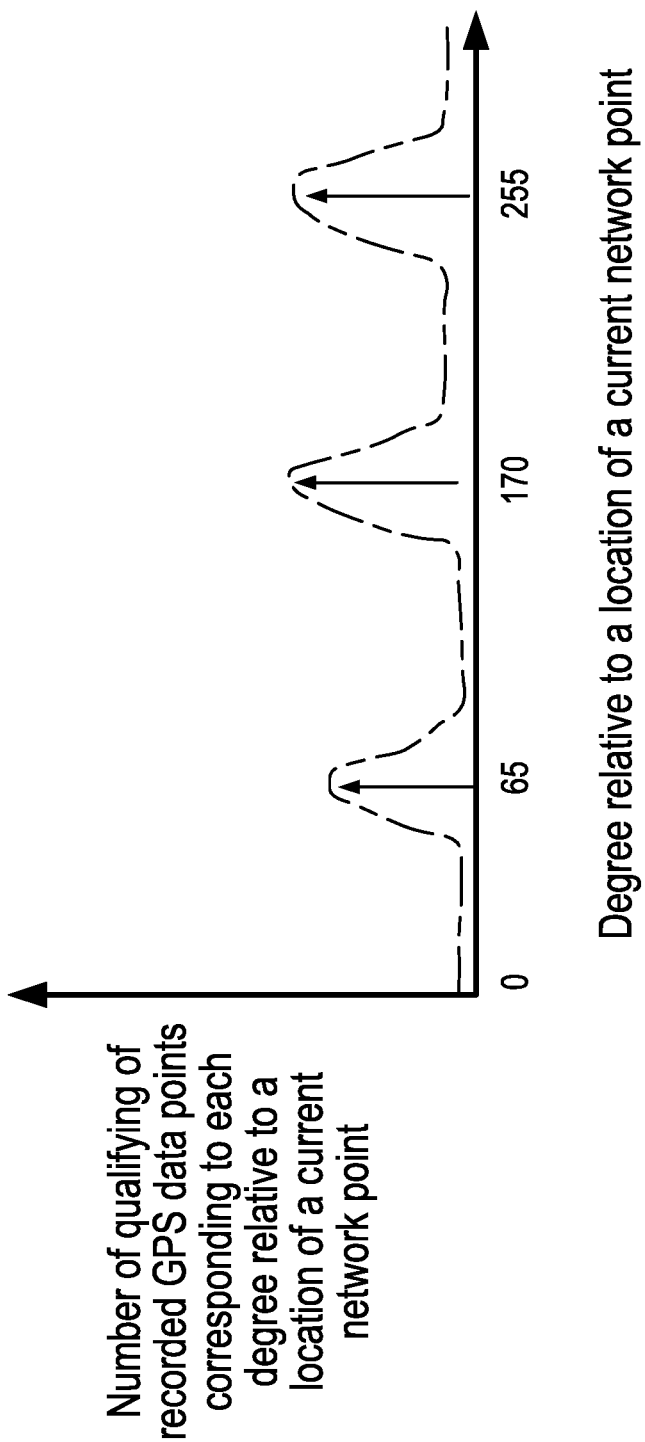
FIG. 16 is a diagram that shows an example of three spikes at three respective degrees relative to a current network point.
Figure 17:
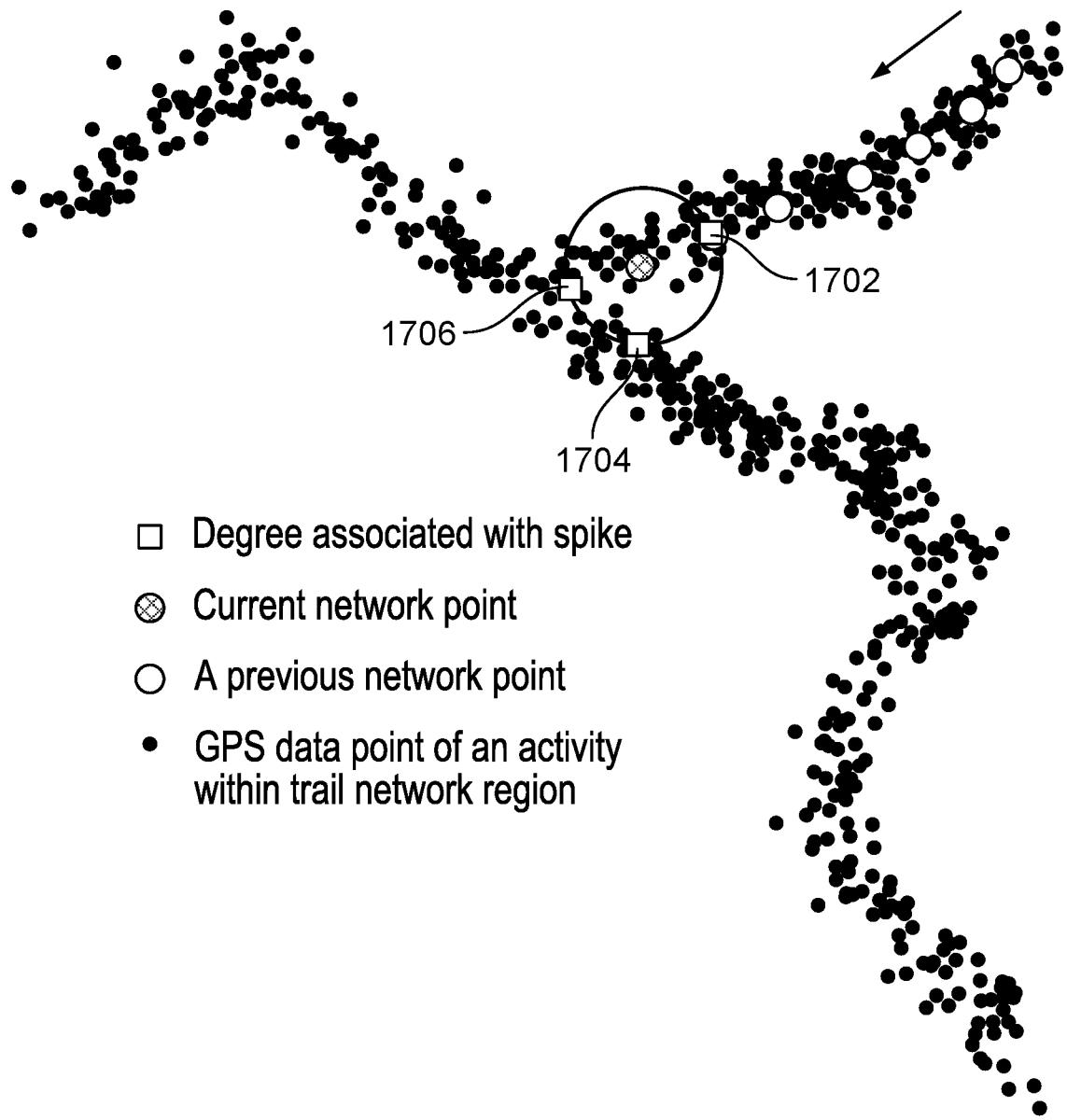
FIG. 17 is a diagram that shows an example that indicates the three locations associated with the three degrees for which spikes have been determined.

In the event that more than two spikes are found, then it is determined that in addition to the two spikes are associated with one degree/direction in front and one degree/direction behind the current network point along the same branch, a third spike is associated with a degree/direction that is associated with a new, different branch. FIG. 16 is a diagram that shows an example of three spikes at three respective degrees relative to a current network point. In the example of FIG. 16, the three spikes are located specifically at $65^{th}$ degree, $170^{th}$ degree, and $255^{th}$ degree relative to a current network point. FIG. 17 is a diagram that shows an example that indicates the three locations associated with the three degrees for which spikes have been determined. In the example, locations 1706, 1704, and 1702 are locations that are each a predetermined distance (e.g., 10 m) away from the current network point associated with degrees for which spikes have been identified. Location 1702 may be disqualified as a next/new current network point of the current branch as its GPS coordinates are too close (e.g., within a predetermined distance from) to the immediately previous network point in the current branch, the GPS data points within the circle corresponding to location 1702 are mostly from activities going in the opposite direction of the direction of the current branch, and/or if GPS data points from the same activity are found within the circle, they are likely from a return trip back at some point later in which case the recorded time will be greater than, for example, a one minute threshold. Therefore, the GPS data point associated with the other remaining locations, locations 1704 and 1706 are either the next/new current network point of the current branch or the first new current network point of a new branch in the trail network. In some embodiments, a predetermined threshold can be applied to the two remaining degrees to determine one as the first new current network point for the new branch. For example, the threshold for a degree to be associated with a new branch is that at least 5% of distinct activities that are within the circle of the degree in question has a direction of travel within a 20 degree buffer of the degree relative to the previous network point along which the current network point is located. The location associated with the degree that is not determined to meet the new branch threshold is therefore set as the new current network point along the current branch.

Returning to FIG. 9, at 916, a location is set along the degree along the new path is set as a new current network point that is associated with the new branch. As described above, the location that is a predetermined distance (e.g., 10 m) away from the current network point along the degree that is determined to be associated with the new branch is set as the new current network point of that new branch. In various embodiments, after a new branch is discovered, an identifier is assigned to the new branch and information associated with the new branch (e.g., a new branch identifier) is stored in a branch data structure (e.g., table).

Figure 18:
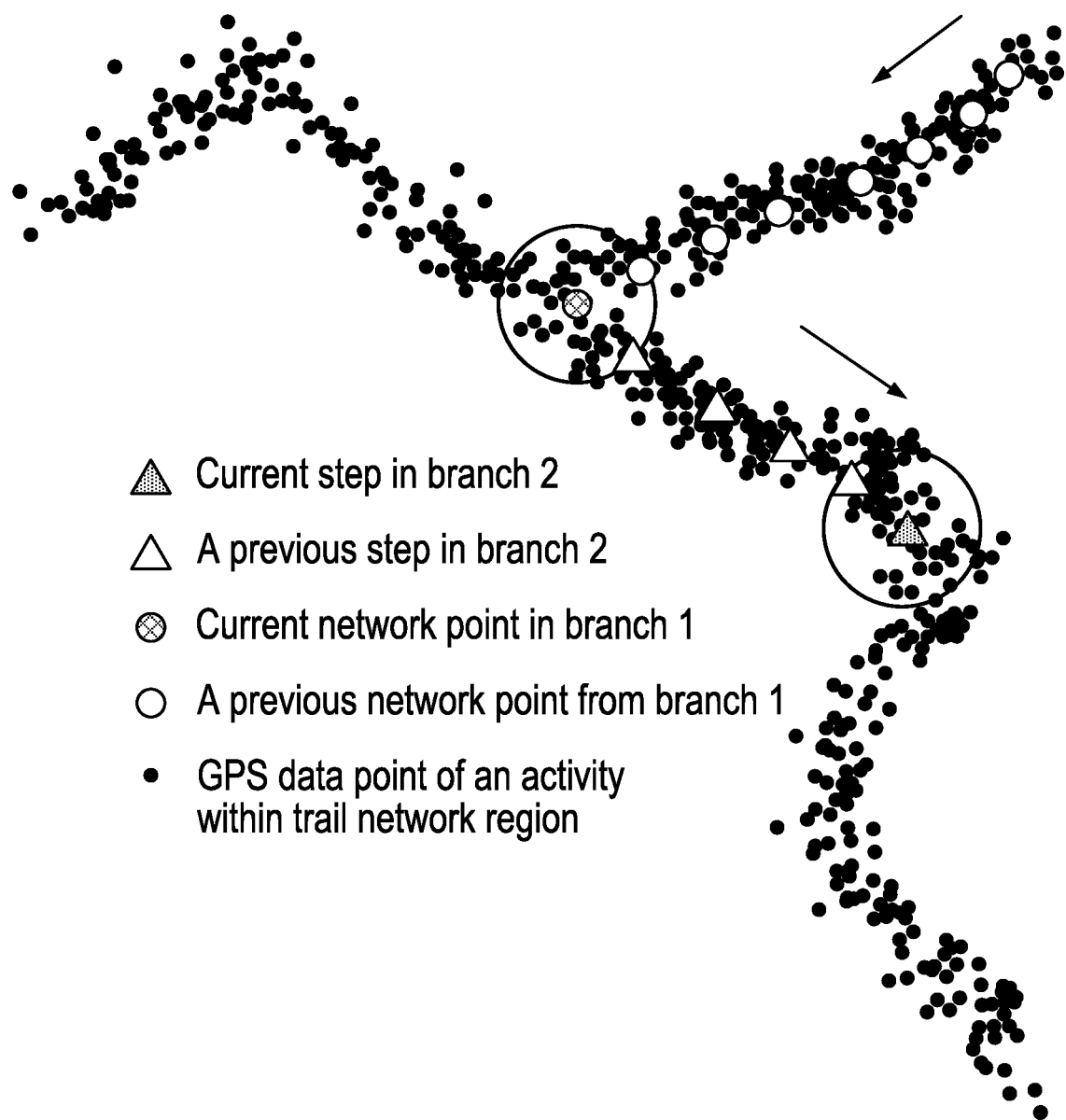
FIG. 18 is a diagram that shows an example of network points that are generated by executing an instance of process 900 of FIG. 9 along the new branch that was discovered in the example of FIG. 17.

In the event that a new branch is discovered, another instance of process 900 is (e.g., asynchronously) executed with the new current network point of that new branch to determine subsequent locations/network points along the new branch and/or discover further branches relative to that new branch. FIG. 18 is a diagram that shows an example of network points that are generated by executing an instance of process 900 of FIG. 9 along the new branch that was discovered in the example of FIG. 17.

Returning to FIG. 9, at 918, a location is set along a selected degree along the current branch is set as a new current network point that is associated with a current branch. As described above, the location that is a predetermined distance (e.g., 10 m) away from the current network point along the degree that is determined to be along the current branch is set as the new current network point of current branch.

At 920, it is determined whether process 900 is to stop generating new network points for the current branch. In the event that it is determined to stop generating new network points for the current branch, process 900 ends. Otherwise, in the event that it is determined to continue to generate new network points for the current branch, control is returned to 904. For example, process 900 may be determined to stop in the event that a new current network point is determined to be outside of the boundaries of the trail network region, which indicates that the locations of the current branch have been determined.

As described above, in various embodiments, multiple instances of process 900 may be executed asynchronously, each to generate network points along a branch of a trail network to fully realize the locations all branches of the trail network.

To avoid redundantly walking along a previously discovered branch, in some embodiments, if a branch is approached from a different direction—it connects to the branch and ends the march and the process of generating network points is continued for a next branch.

Figure 19:
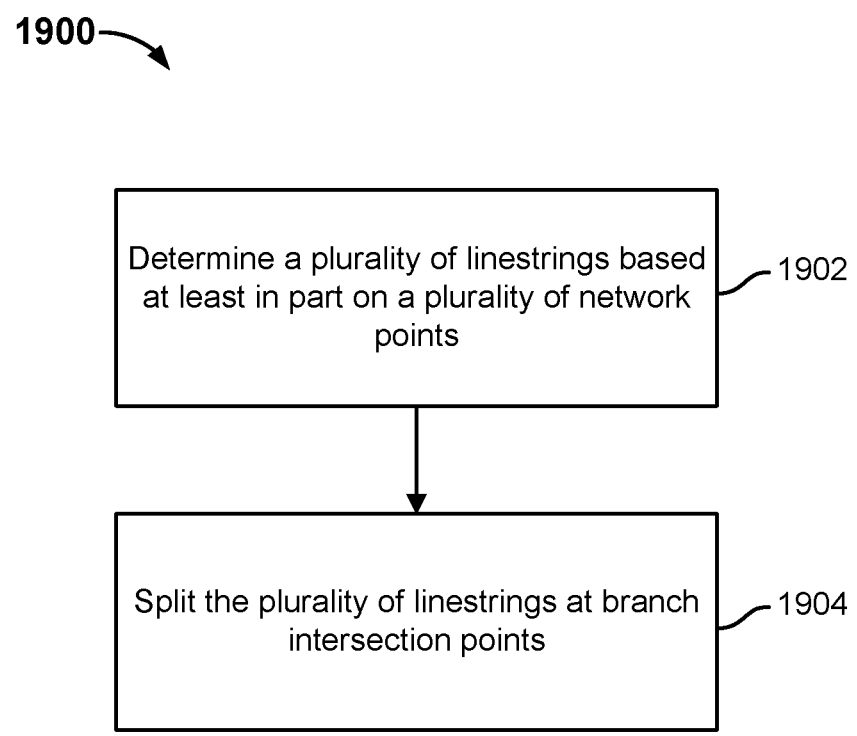
FIG. 19 is a flow diagram showing an example of generating linestrings corresponding to branches of a trail network in accordance with some embodiments.

FIG. 19 is a flow diagram showing an example of generating linestrings corresponding to branches of a trail network in accordance with some embodiments. In some embodiments, process 1900 is implemented at a system such as system 100 of FIG. 1. Specifically, in some embodiments, process 1900 is implemented at trail network map generation server 108 of system 100 of FIG. 1. In some embodiments, step 306 of process 300 of FIG. 3 is implemented at least in part using process 1900.

At 1902, a plurality of linestrings is determined based at least in part on a plurality of network points. In various embodiments, a "linestring" comprises a continuous line that is drawn through the network points belonging to a branch to form a continuous representation of the branch. After step 1902, each branch of the trail network is represented by a continuous line and linestrings associated with intersecting branches also intersect. Network points in a series may be connected to form a line, using a technique such as ST_makeline in POSTgis, for example. For example, the last point of both ends of the line terminates at the point of intersection to the other branches.

At 1904, the plurality of linestrings is split at branch intersection points. An intersection of linestrings corresponding to an intersection of two or more branches is split. Splitting linestrings at intersections enables each branch to be individually routable. For example, anywhere a branch is intersected with another branch, the intersected branch is split into separate linestrings at the point of intersection using a technique such ST_splitline in POSTgis, which enables routing, for example.

Figure 20A:
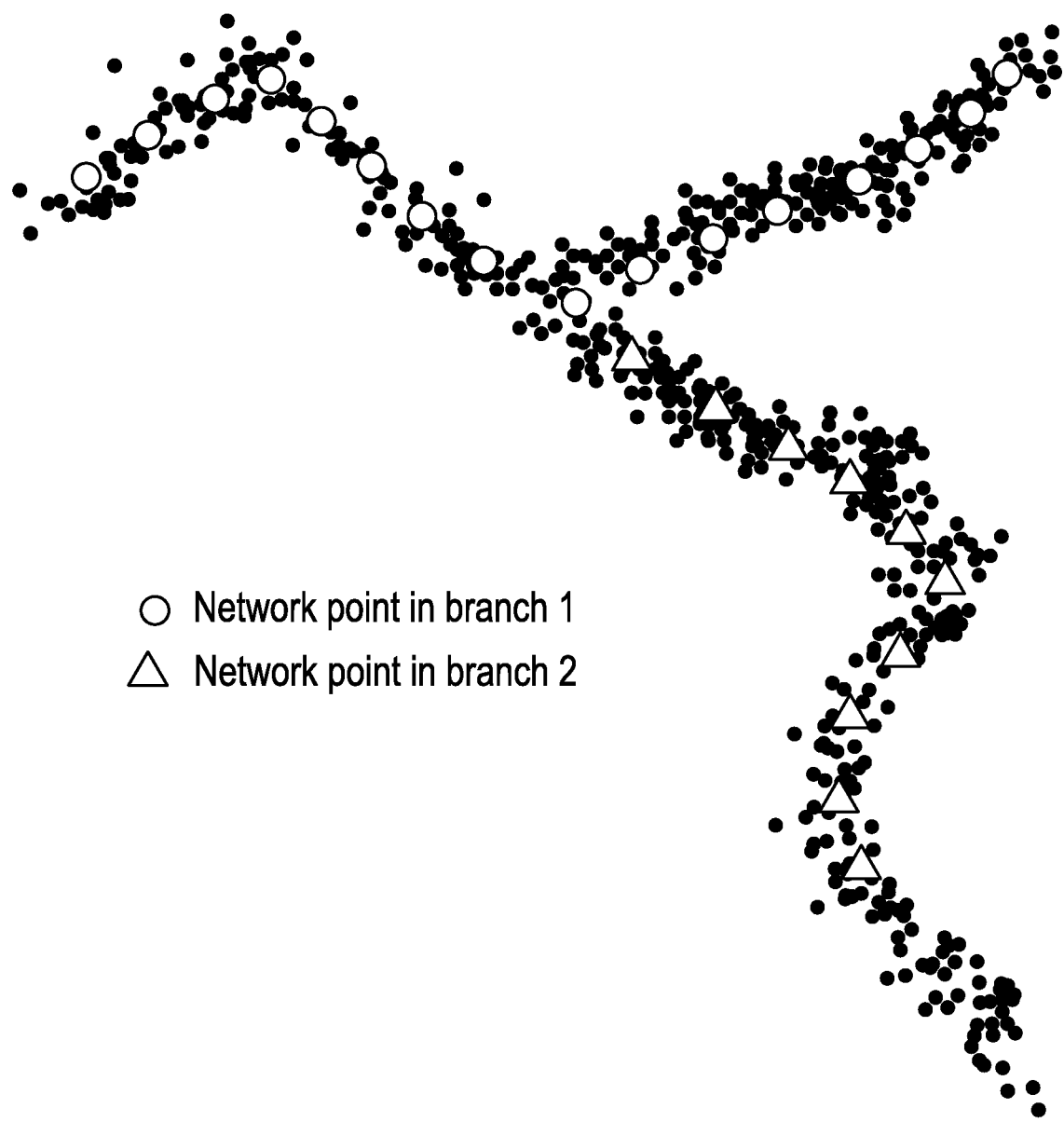
FIG. 20A is a diagram that shows network points that have been generated for two branches of a trail network.
Figure 20B:
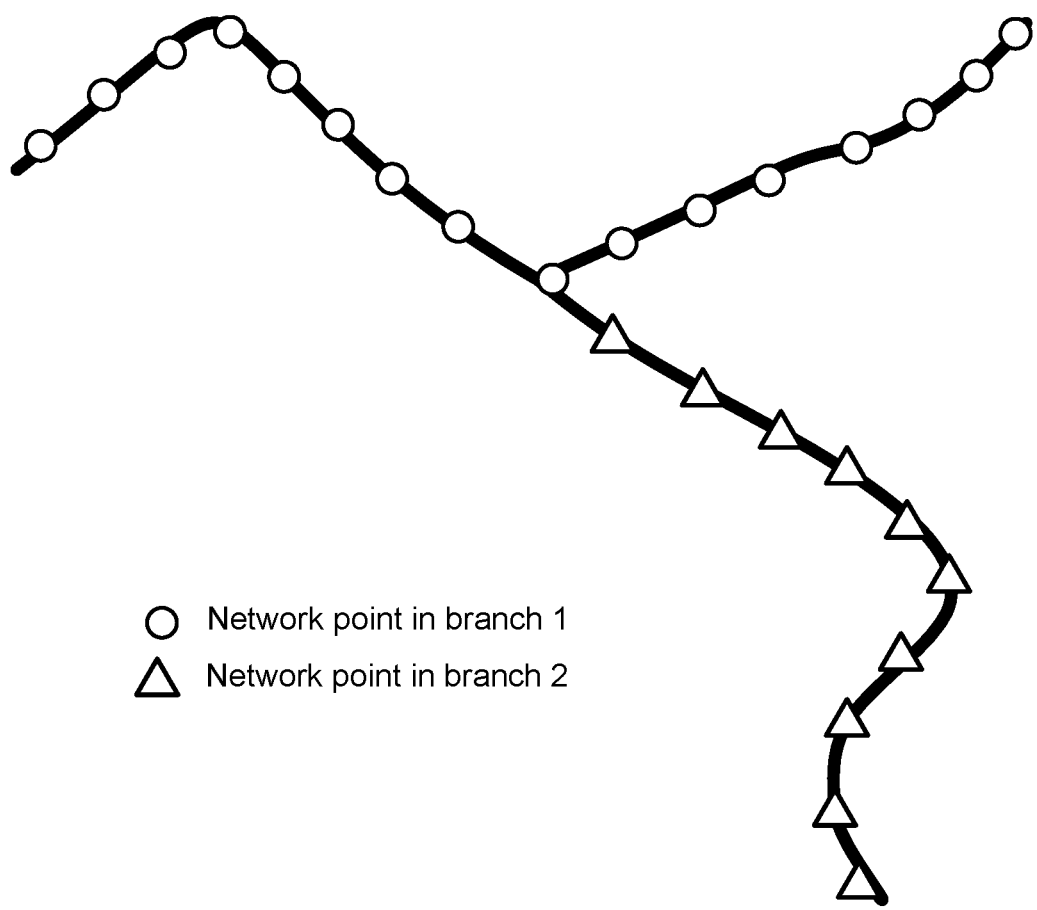
FIG. 20B is a diagram that shows linestrings that are generated based on network points of each branch.
Figure 20C:
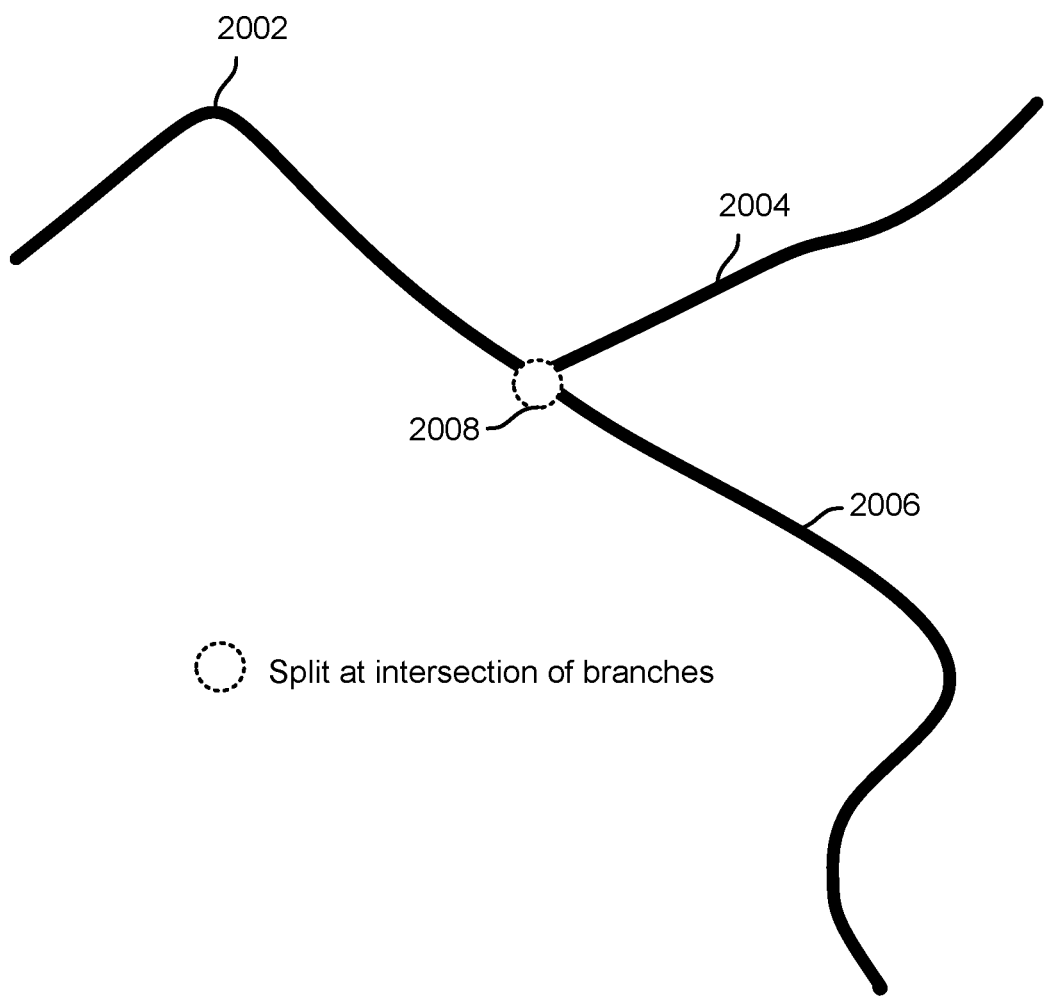
FIG. 20C is a diagram that shows a split that is generated at the intersection of linestrings corresponding to two intersecting branches.

FIGS. 20A, 20B, and 20C, below, show one example of generating a trail network map corresponding to network points generated for branches in a trail network.

FIG. 20A is a diagram that shows network points that have been generated for two branches of a trail network. As shown in FIG. 20A, several network points have been generated for two branches, branch 1 and branch 2, of a trail network.

FIG. 20B is a diagram that shows linestrings that are generated based on network points of each branch. As shown in FIG. 20B, a continuous line (a linestring) has been drawn through all the network points that have been generated for each of branch 1 and branch 2 of the trail network.

FIG. 20C is a diagram that shows a split that is generated at the intersection of linestrings corresponding to two intersecting branches. By creating split 2008 at the intersection of branch 1 and branch 2 that were shown in FIG. 20A, three paths, paths 2002, 2004, and 2006 are generated and are individually routable paths. For example, after paths 2002, 2004, and 2006 are generating via splitting of the linestrings, a routing process can route a user at the intersection associated with split 2008 towards one of paths 2002, 2004, and 2006.

In an example implementation, the above-described processes may be implemented using the Java programming language or another high-level programming language, the generated data can be stored in the above-described data table(s) using a spatially enabled database, such as using PostGIS or Oracle Spatial or using another open source or commercially available spatially enabled database, and the process can be executed on server class hardware, such as using a data center services solution, such as Amazon Web Services (AWS) or another outsourced data center services solution.

The result of the above-described processes generates a global system of trail networks from Global Positioning System (GPS) data that is collected from mobile devices.

For example, the disclosed techniques for generating trail network maps can be applied to generate a global system of trail networks based on GPS data that can be collected from users of an activity/mapping application (e.g., the commercially available Strava® mobile application (app)) or another activity/mapping application that can collect GPS data from mobile devices (e.g., mobile devices that can provide a GPS tracker using embedded GPS receivers, such as smart phones, GPS devices, and/or other mobile devices that support GPS tracking).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive a plurality of Global Position System (GPS) recorded activities;
identify a subset of the plurality of GPS recorded activities that is associated with a trail network region; and
generate a trail network map corresponding to the trail network region based at least in part on the subset of the plurality of GPS recorded activities, including to:
store data associated with a current network point within the trail network region, wherein the current network point comprises a determined portion of a branch of the trail network map;
determine a plurality of circles around respective ones of a plurality of locations that is each a predetermined distance away from the current network point in respective directions along a set of degrees relative to the current network point;
for each circle of the plurality of circles, determine a respective set of qualifying recorded GPS data points, from activity data, that are included within that circle;
select a degree associated with a corresponding circle that includes a respective number of qualifying recorded GPS data points that meet a set of predetermined criteria;
determine a next network point in the branch relative to the current network point based at least in part on the selected degree;
determine the branch of the trail network map to include a plurality of network points including at least the current network point and the next network point; and
cause the trail network map to be presented at a user interface; and
a non-transitory memory coupled to the processor and configured to provide the processor with instructions.

2. The system of claim 1, wherein the processor is further configured to identify the trail network region, wherein the trail network region comprises an area of geography that is determined to include a trail network.

3. The system of claim 1, wherein the processor is further configured to:
determine activity data that intersects a plurality of tiles associated with the trail network region, wherein the activity data comprises one or more GPS recorded activities associated with corresponding one or more instances of athletic performance; and
store each GPS data point of at least a subset of GPS data points of the determined activity data with a corresponding set of attributes in a data structure.

4. The system of claim 1, wherein the processor is further configured to:
determine an initial network point associated with a trail network associated with the trail network region based at least in part on selecting a recorded GPS data point from activity data that intersects the trail network region; and
use the initial network point and at least a subset of the activity data to recursively determine network points along one or more branches of a trail network.

5. The system of claim 1, wherein the processor is further configured to:
determine an initial network point associated with a trail network associated with the trail network region based at least in part on selecting a recorded GPS data point from activity data that intersects the trail network region, including to determine that the initial network point is recorded by a selected type of GPS enabled device; and
use the initial network point and at least a subset of the activity data to recursively determine network points along one or more branches of a trail network.

6. The system of claim 1, wherein the processor is further configured to:
determine an initial network point associated with a trail network associated with the trail network region based at least in part on selecting a recorded GPS data point from activity data that intersects the trail network region, including to determine that at least a threshold number of distinct activities intersect a predetermined area around the initial network point; and
use the initial network point and at least a subset of the activity data to recursively determine network points along one or more branches of a trail network.

7. The system of claim 1, wherein the degree comprises a first degree, and wherein the processor is further configured to:
determine that a second degree of the set of degrees is along a new path;
determine that a new branch of a trail network has been found; and
set a location along the second degree along the new path as a new current network point of the new branch.

8. The system of claim 1, wherein to generate the trail network map corresponding to the trail network region comprises to:
determine a plurality of linestrings based at least in part on the plurality of network points corresponding to one or more branches of a trail network associated with the trail network region; and
split the plurality of linestrings at branch intersection points.

9. A method, comprising:
receiving a plurality of Global Position System (GPS) recorded activities;
identifying a subset of the plurality of GPS recorded activities that is associated with a trail network region; and
generating a trail network map corresponding to the trail network region based at least in part on the subset of the plurality of GPS recorded activities, including:
storing data associated with a current network point within the trail network region, wherein the current network point comprises a determined portion of a branch of the trail network map;

determining a plurality of circles around respective ones of a plurality of locations that is each a predetermined distance away from the current network point in respective directions along a set of degrees relative to the current network point;

for each circle of the plurality of circles, determining a respective set of qualifying recorded GPS data points, from activity data, that are included within that circle;

selecting a degree associated with a corresponding circle that includes a respective number of qualifying recorded GPS data points that meet a set of predetermined criteria;

determining a next network point in the branch relative to the current network point based at least in part on the selected degree;

determining the branch of the trail network map to include a plurality of network points including at least the current network point and the next network point; and causing the trail network map to be presented at a user interface.

10. The method of claim 9, further comprising:
determining activity data that intersects a plurality of tiles associated with the trail network region, wherein the activity data comprises one or more GPS recorded activities associated with corresponding one or more instances of athletic performance; and
storing each GPS data point of at least a subset of GPS data points of the determined activity data with a corresponding set of attributes in a data structure.

11. The method of claim 9, further comprising:
determining an initial network point associated with a trail network associated with the trail network region based at least in part on selecting a recorded GPS data point from activity data that intersects the trail network region; and
using the initial network point and at least a subset of the activity data to recursively determine network points along one or more branches of a trail network.

12. The method of claim 9, further comprising:
determining an initial network point associated with a trail network associated with the trail network region based at least in part on selecting a recorded GPS data point from activity data that intersects the trail network region, including determining that the initial network point is recorded by a selected type of GPS enabled device; and
using the initial network point and at least a subset of the activity data to recursively determine network points along one or more branches of a trail network.

13. The method of claim 9, further comprising:
determining an initial network point associated with a trail network associated with the trail network region based at least in part on selecting a recorded GPS data point from activity data that intersects the trail network region, including determining that at least a threshold number of distinct activities intersect a predetermined area around the initial network point; and
using the initial network point and at least a subset of the activity data to recursively determine network points along one or more branches of a trail network.

14. The method of claim 9, wherein the degree comprises a first degree, and further comprising:

determining that a second degree of the set of degrees is along a new path;
determining that a new branch of a trail network has been found; and
setting a location along the second degree along the new path as a new current network point of the new branch.

15. The method of claim 9, wherein generating the trail network map corresponding to the trail network region comprises:
determining a plurality of linestrings based at least in part on the plurality of network points corresponding to one or more branches of a trail network associated with the trail network region; and
splitting the plurality of linestrings at branch intersection points.

16. A computer program product, the computer program product being embodied in a non-transitory computer readable storage medium and comprising computer instructions for:
receiving a plurality of Global Position System (GPS) recorded activities;
identifying a subset of the plurality of GPS recorded activities that is associated with a trail network region; and
generating a trail network map corresponding to the trail network region based at least in part on the subset of the plurality of GPS recorded activities, including:
storing data associated with a current network point within the trail network region, wherein the current network point comprises a determined portion of a branch of the trail network map;
determining a plurality of circles around respective ones of a plurality of locations that is each a predetermined distance away from the current network point in respective directions along a set of degrees relative to the current network point;
for each circle of the plurality of circles, determining a respective set of qualifying recorded GPS data points, from activity data, that are included within that circle;
selecting a degree associated with a corresponding circle that includes a respective number of qualifying recorded GPS data points that meet a set of predetermined criteria;
determining a next network point in the branch relative to the current network point based at least in part on the selected degree;
determining the branch of the trail network map to include a plurality of network points including at least the current network point and the next network point; and
causing the trail network map to be presented at a user interface.

17. The computer program product of claim 16, further comprising computer instructions for:
determining activity data that intersects a plurality of tiles associated with the trail network region, wherein the activity data comprises one or more GPS recorded activities associated with corresponding one or more instances of athletic performance; and
storing each GPS data point of at least a subset of GPS data points of the determined activity data with a corresponding set of attributes in a data structure.

18. The computer program product of claim 16, further comprising computer instructions for:
determining an initial network point associated with a trail network associated with the trail network region based at least in part on selecting a recorded GPS data point from activity data that intersects the trail network region; and using the initial network point and at least a subset of the activity data to recursively determine network points along one or more branches of a trail network.

\* \* \* \* \*

UNITED STATES PATENT AND TRADEMARK OFFICE
CERTIFICATE OF CORRECTION

PATENT NO. : 11,009,362 B2  
APPLICATION NO. : 16/529657  
DATED : May 18, 2021  
INVENTOR(S) : Davis Kitchel Page 1 of 1

It is certified that error appears in the above-identified patent and that said Letters Patent is hereby corrected as shown below:

In the Specification

In Column 4, Line(s) 7, after "and", delete ")".
In Column 4, Line(s) 7, after "RunKeeper®", insert --)--.

Signed and Sealed this  
First Day of March, 2022

Drew Hirshfeld  
*Performing the Functions and Duties of the*  
*Under Secretary of Commerce for Intellectual Property and*  
*Director of the United States Patent and Trademark Office*